United States Patent
Jin et al.

(10) Patent No.: US 11,425,611 B2
(45) Date of Patent: Aug. 23, 2022

(54) CIRCUIT SWITCHED FALLBACK METHOD AND APPARATUS

(71) Applicant: Huawei Technologies Co., Ltd., Shenzhen (CN)

(72) Inventors: Hui Jin, Beijing (CN); Fenghui Dou, Beijing (CN); Hongcheng Zhuang, Dongguan (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 17/044,001

(22) PCT Filed: Apr. 26, 2019

(86) PCT No.: PCT/CN2019/084422
§ 371 (c)(1),
(2) Date: Sep. 30, 2020

(87) PCT Pub. No.: WO2019/206248
PCT Pub. Date: Oct. 31, 2019

(65) Prior Publication Data
US 2021/0037430 A1    Feb. 4, 2021

(30) Foreign Application Priority Data

Apr. 26, 2018 (CN) .......................... 201810385818.8
Jul. 28, 2018 (CN) .......................... 201810850349.2

(51) Int. Cl.
*H04W 36/00* (2009.01)
*H04W 60/00* (2009.01)
(Continued)

(52) U.S. Cl.
CPC ....... *H04W 36/0022* (2013.01); *H04W 60/00* (2013.01); *H04W 68/005* (2013.01); *H04W 76/27* (2018.02)

(58) Field of Classification Search
CPC ............. H04W 36/0022; H04W 60/00; H04W 68/005; H04W 76/27; H04W 36/0079
(Continued)

(56) References Cited

U.S. PATENT DOCUMENTS 7,558,239 B1 *   7/2009   Rasanen ............ H04Q 11/0457
                                                              370/338
2010/0172301 A1   7/2010   Watfa et al.
(Continued)

FOREIGN PATENT DOCUMENTS

CN         103476073 A       12/2013
CN         103716852 A       4/2014
(Continued)

OTHER PUBLICATIONS

S2-175487, China Unicom, "Procedure of Voice fallback in 23.502," SA WG2 Meeting #122bis, Jul. 21-25, 2017, Sophia Antipolis, France, 5 pages.
(Continued)

*Primary Examiner* — Michael Y Mapa
(74) *Attorney, Agent, or Firm* — Conley Rose, P.C.

(57) ABSTRACT

A circuit switched fallback (CSFB) method and apparatus, where a user equipment (UE) initiates a calling process, receives a first request from a first communications system, and after the UE is transferred to a second communications system and before the UE receives a first message from the second communications system, the UE determines that a voice call bearer cannot be set up in the second communications system, and initiates a CSFB in the second commu-
(Continued)

nications system, where the first message is used by the UE to determine that a call request has failed.

20 Claims, 26 Drawing Sheets

(51) Int. Cl.
*H04W 68/00* (2009.01)
*H04W 76/27* (2018.01)

(58) Field of Classification Search
USPC .................. 370/331; 455/417, 435.1–445
See application file for complete search history.

(56) References Cited

U.S. PATENT DOCUMENTS

| | | | |
|---|---|---|---|
| 2013/0250916 A1 | 9/2013 | Aoyagi et al. | |
| 2019/0191349 A1 | 6/2019 | Kim et al. | |
| 2021/0037430 A1* | 2/2021 | Jin | H04W 60/00 |
| 2021/0185567 A1* | 6/2021 | Zhang | H04W 36/0022 |

FOREIGN PATENT DOCUMENTS

| | | |
|---|---|---|
| CN | 105657762 A | 6/2016 |
| CN | 106255083 A | 12/2016 |
| CN | 106792937 A | 5/2017 |
| CN | 107529199 A | 12/2017 |
| WO | 2011023091 A1 | 3/2011 |
| WO | 2013172623 A1 | 11/2013 |
| WO | 2015167720 A1 | 11/2015 |
| WO | 2018038497 A1 | 3/2018 |

OTHER PUBLICATIONS

3GPP TS 23.237 V15.1.0, "3rd Generation Partnership Project; Technical Specification Group Services and System Aspects; IP Multimedia Subsystem (IMS) Service Continuity; Stage 2 (Release 15)," Dec. 2017, 182 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

* cited by examiner

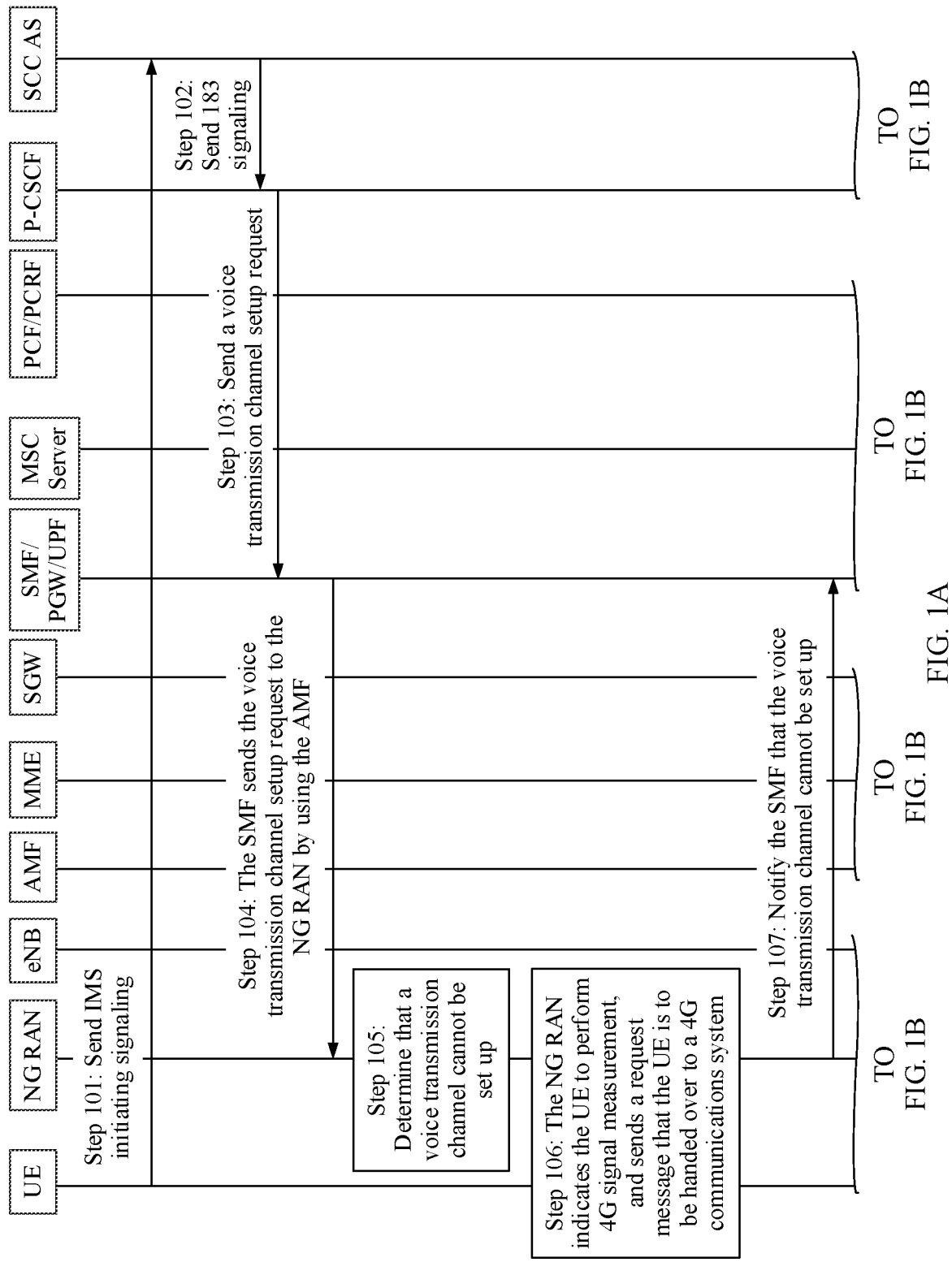

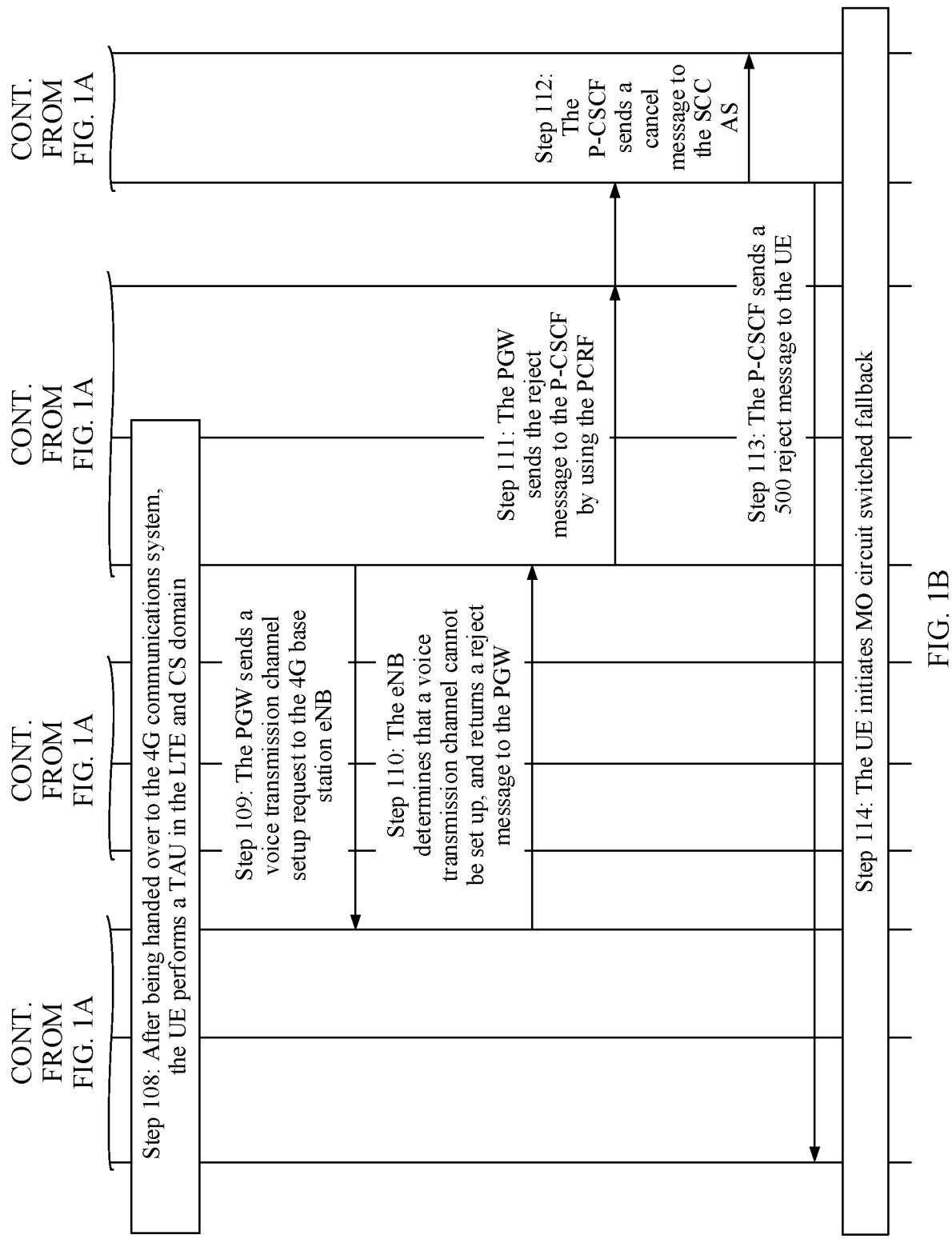

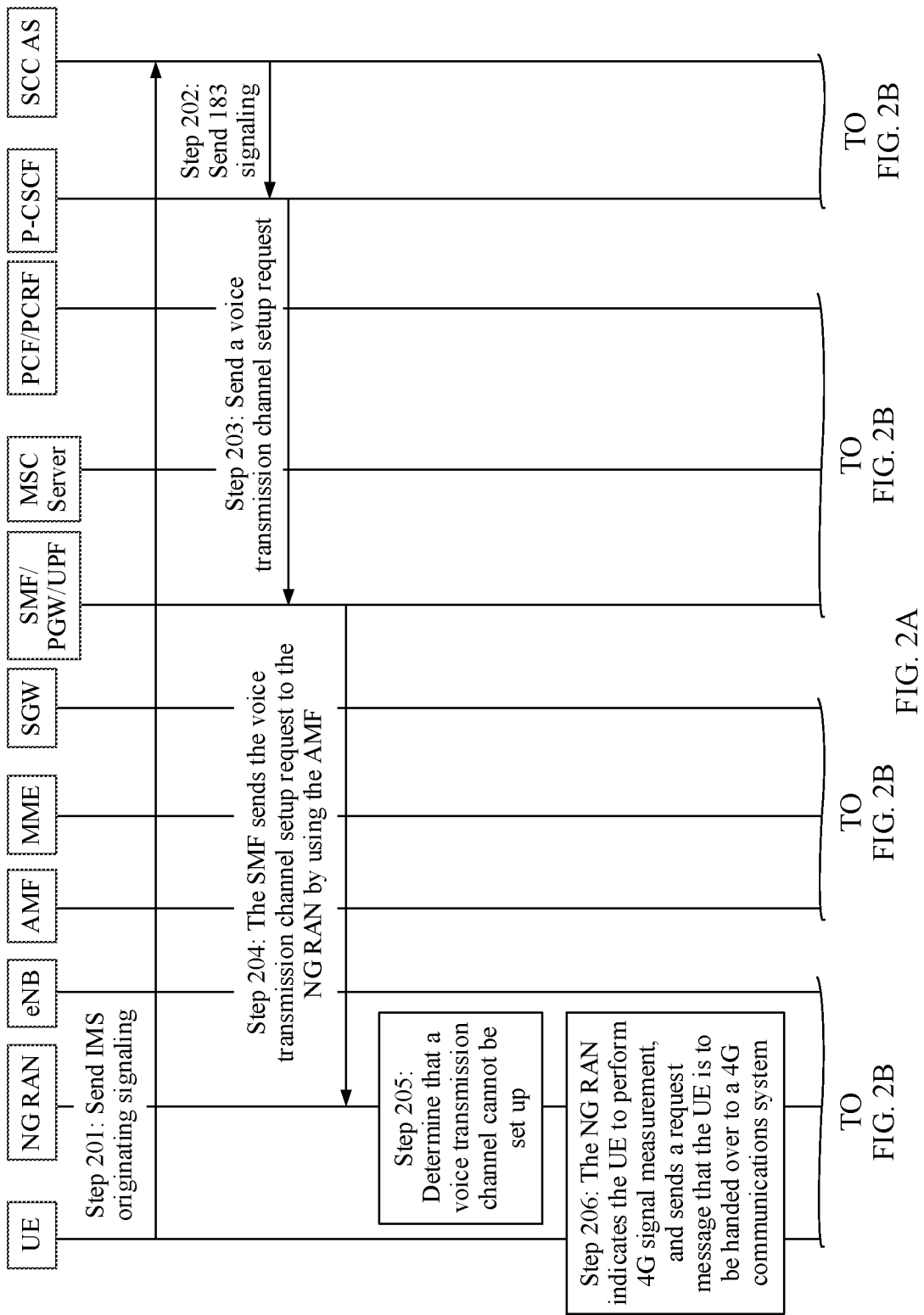

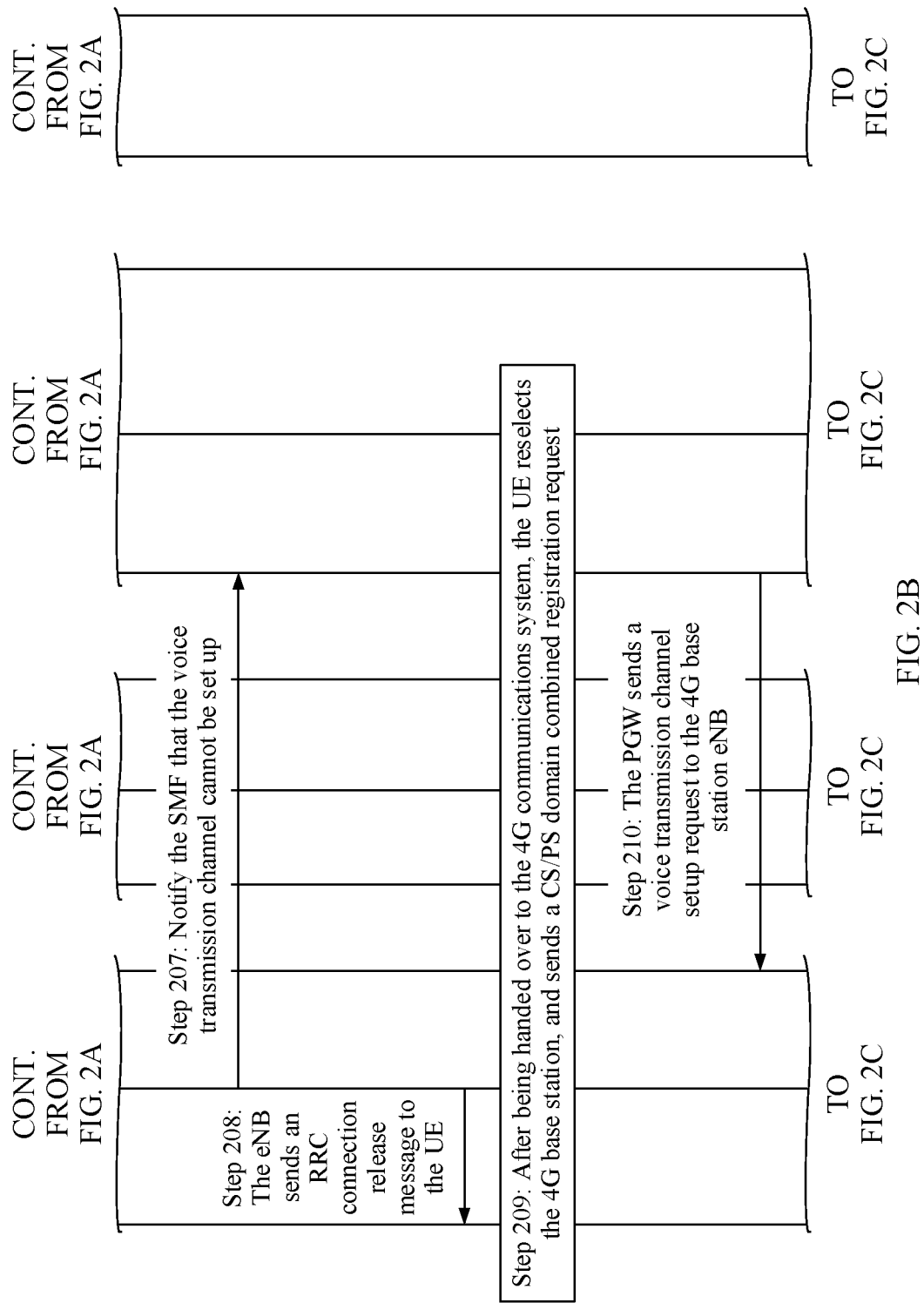

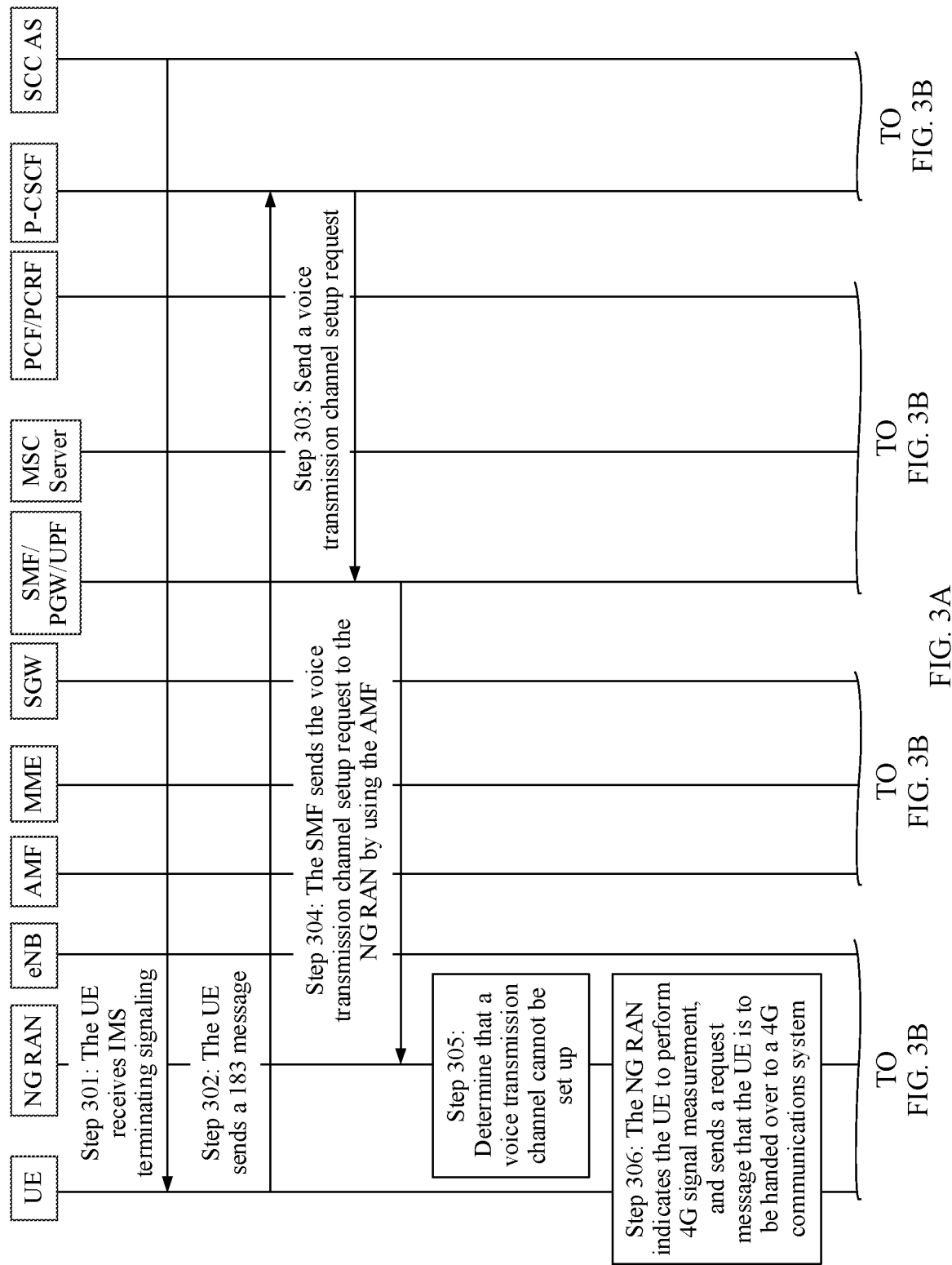

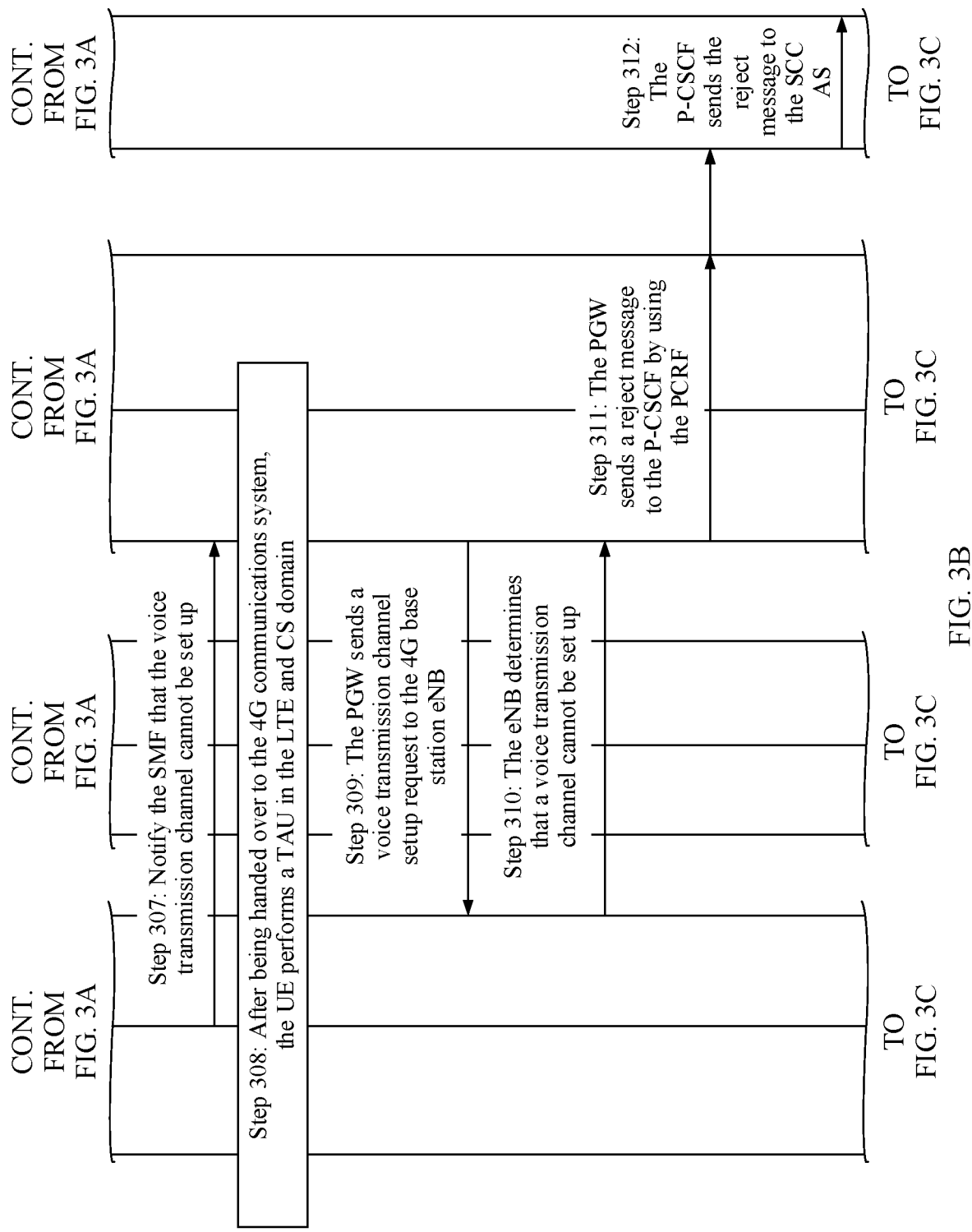

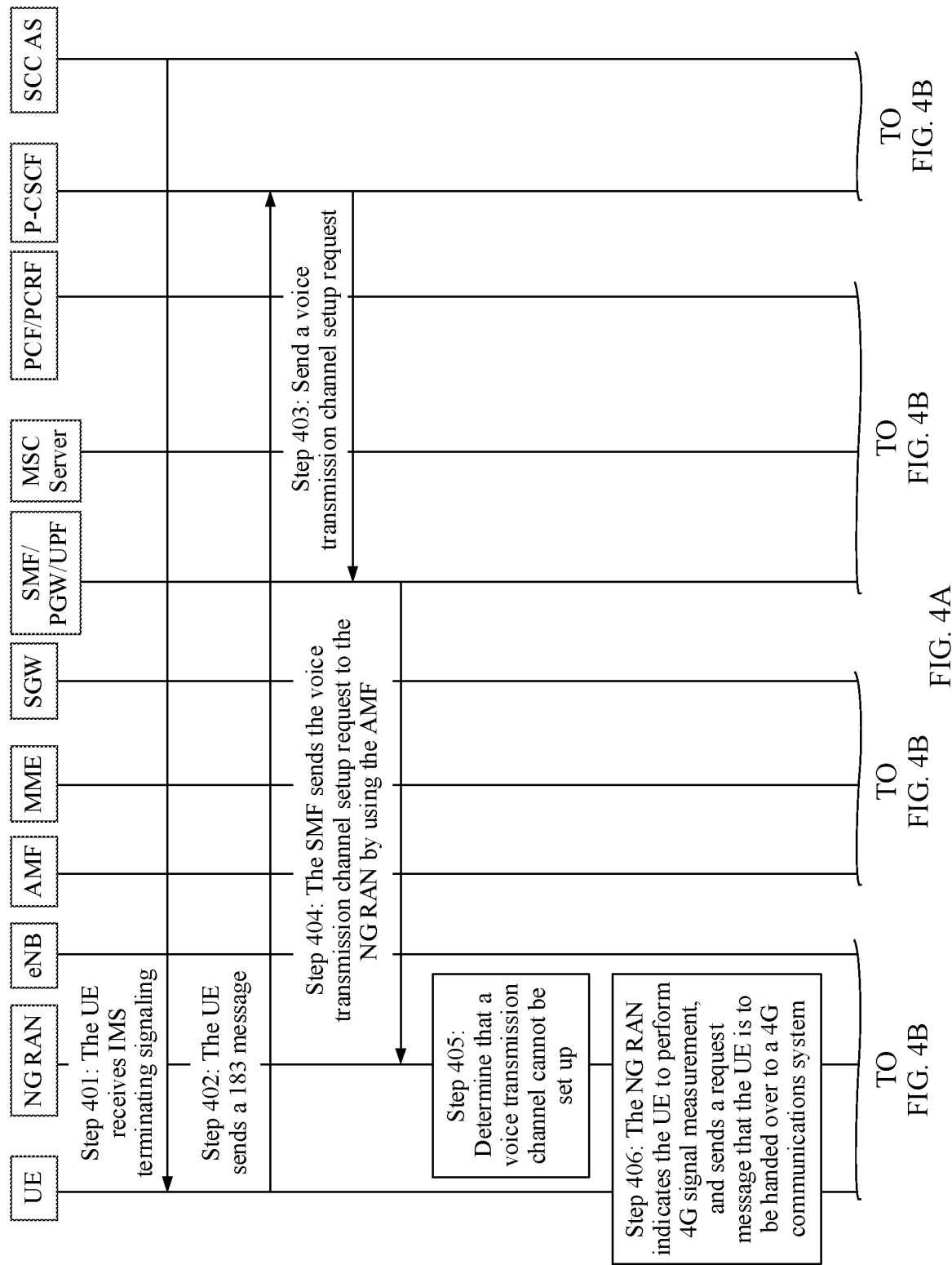

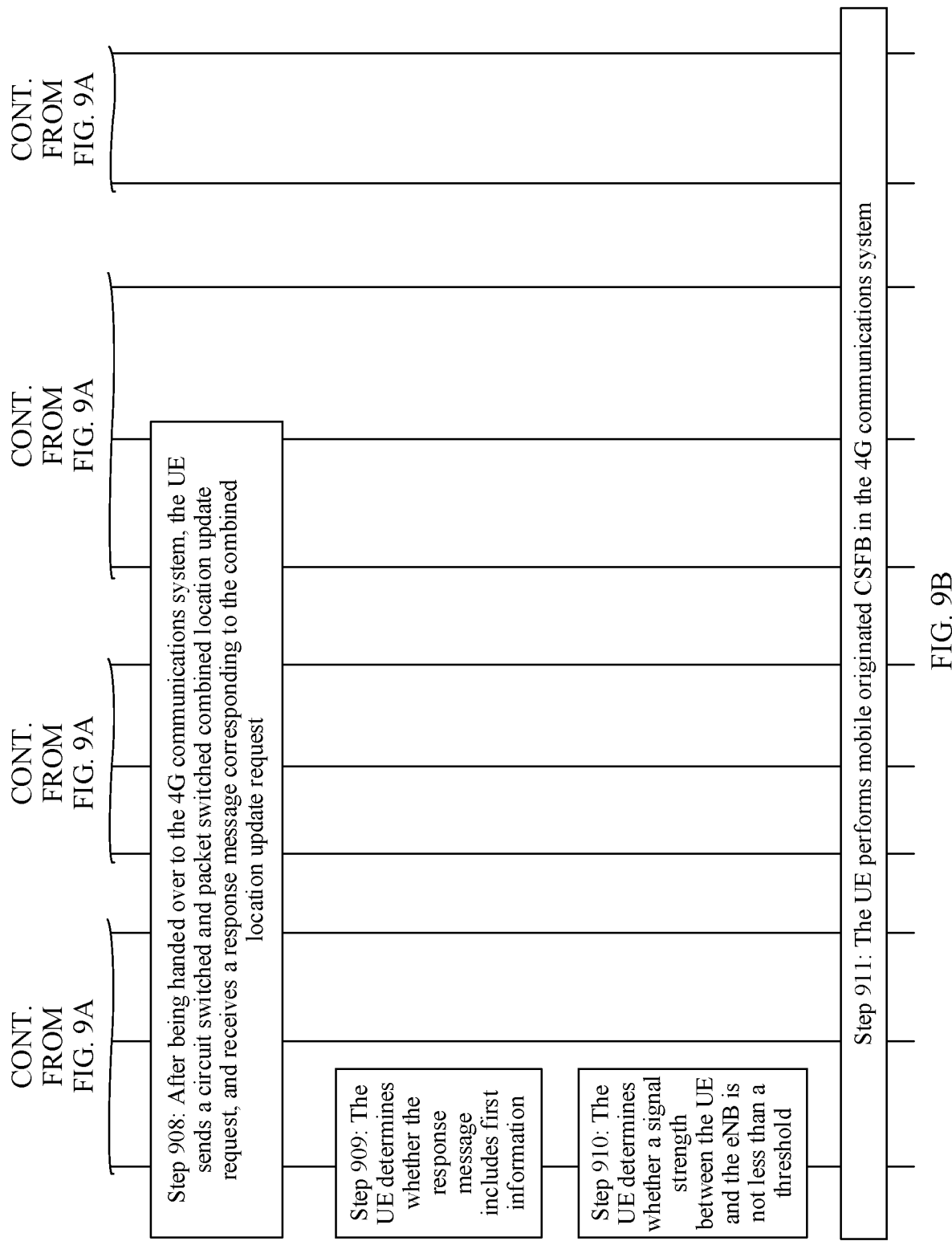

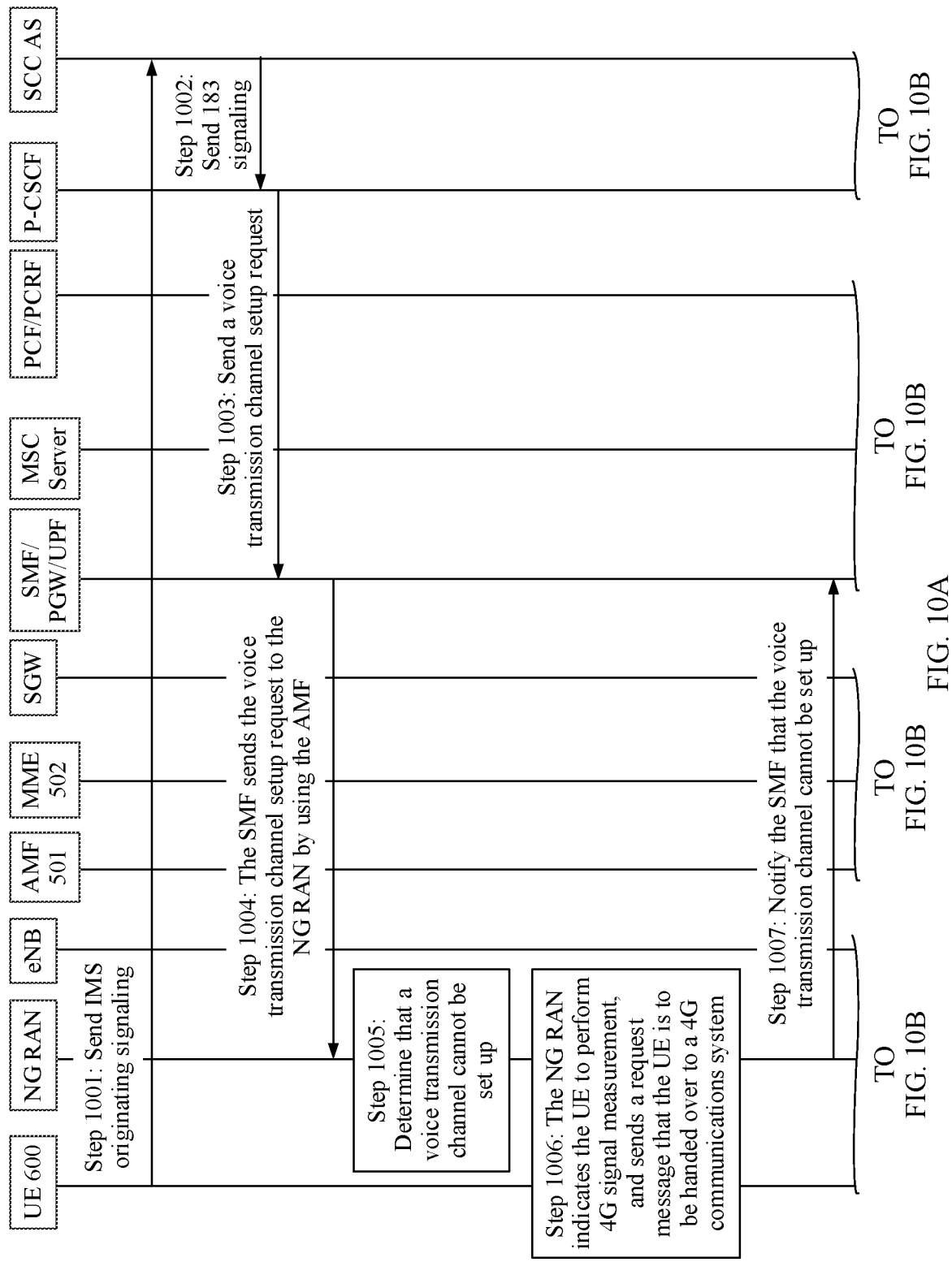

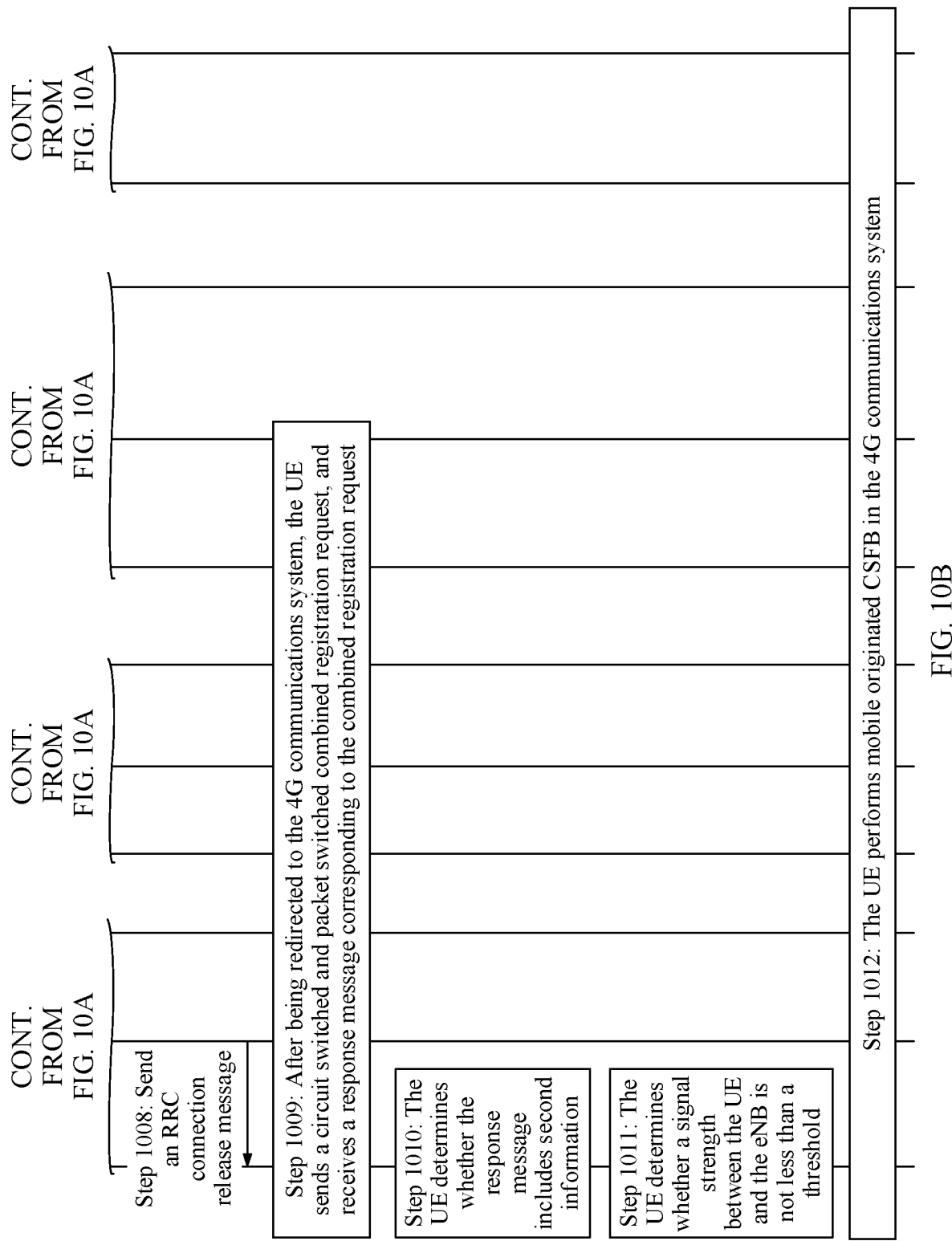

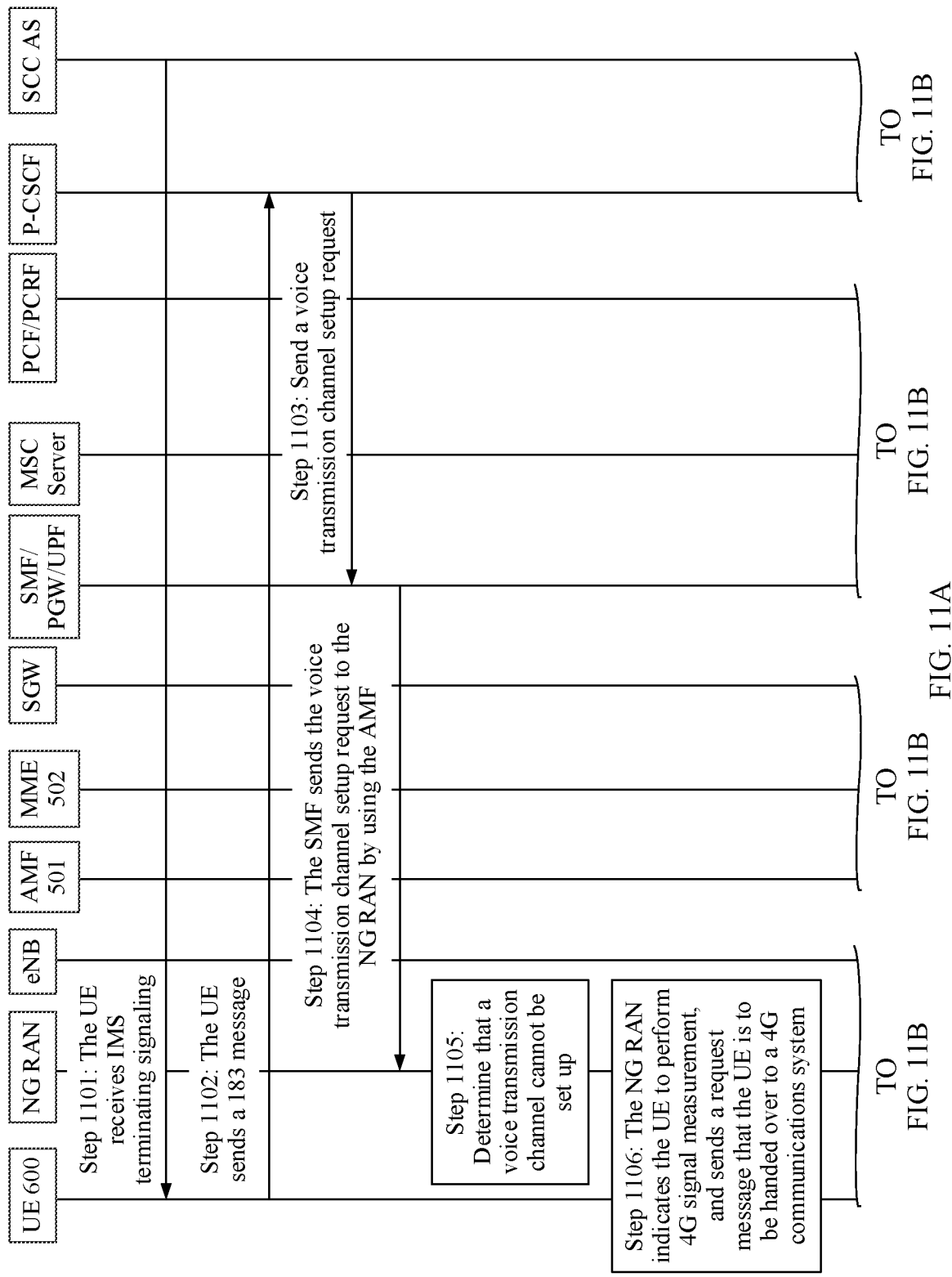

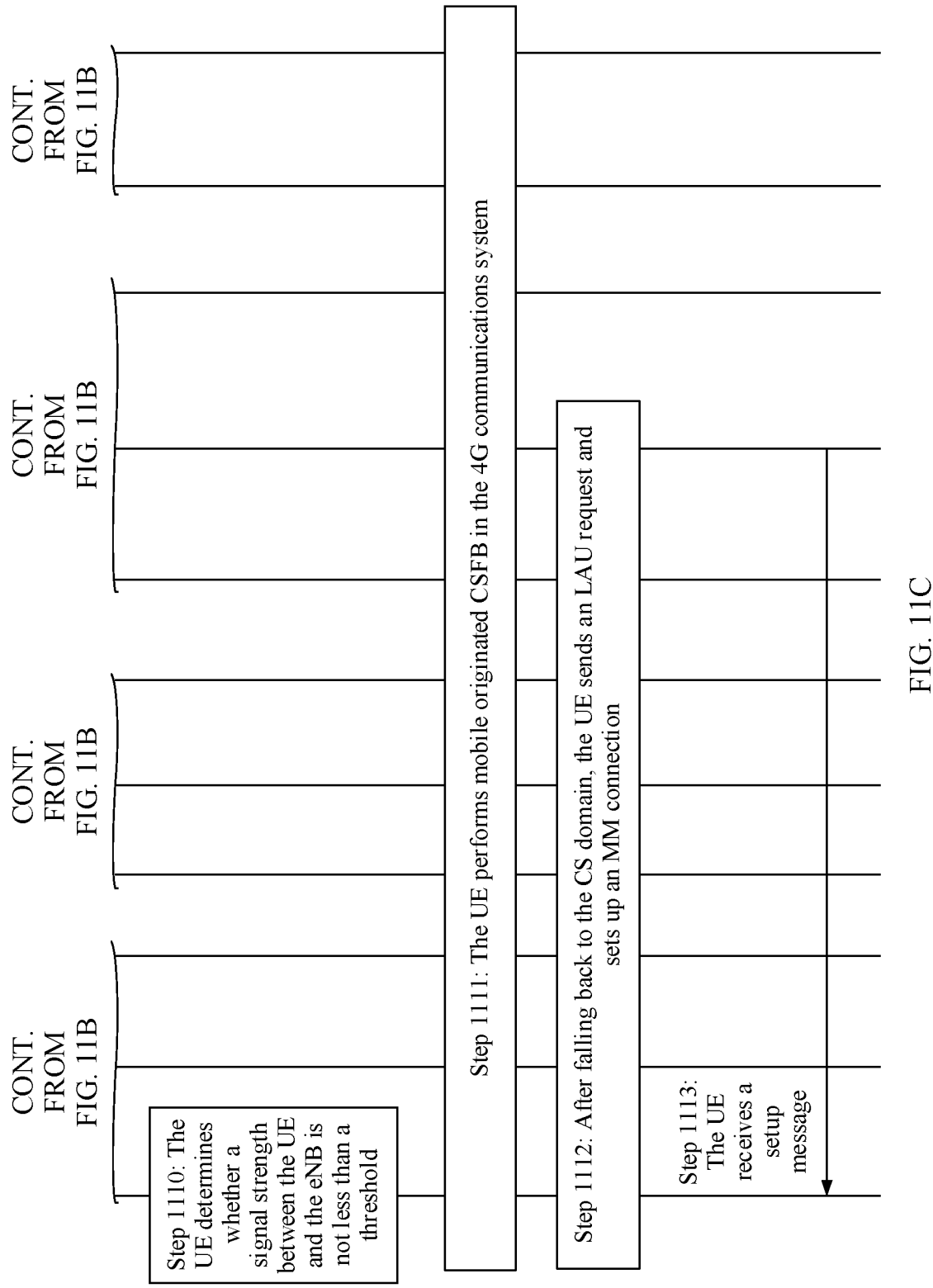

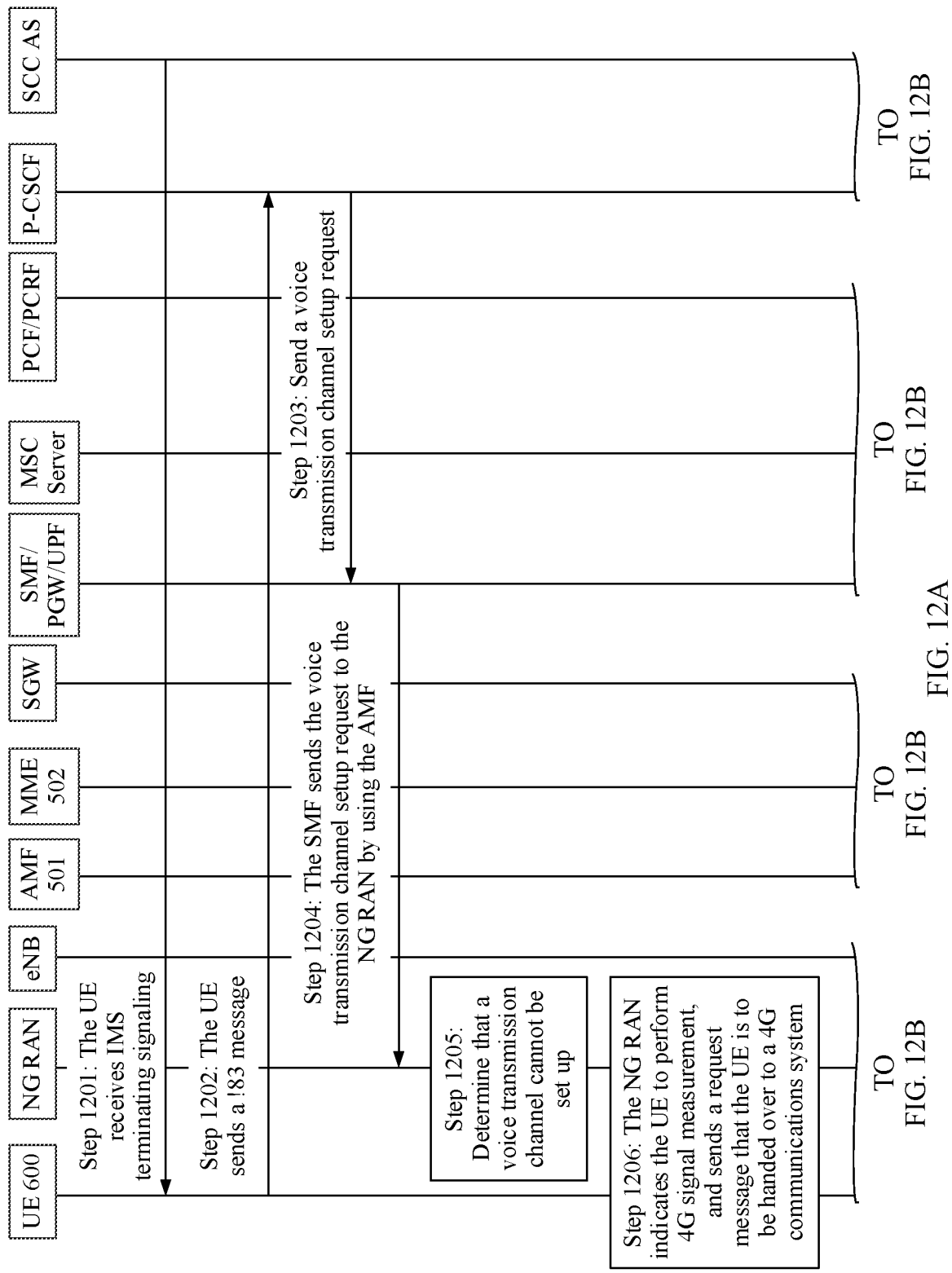

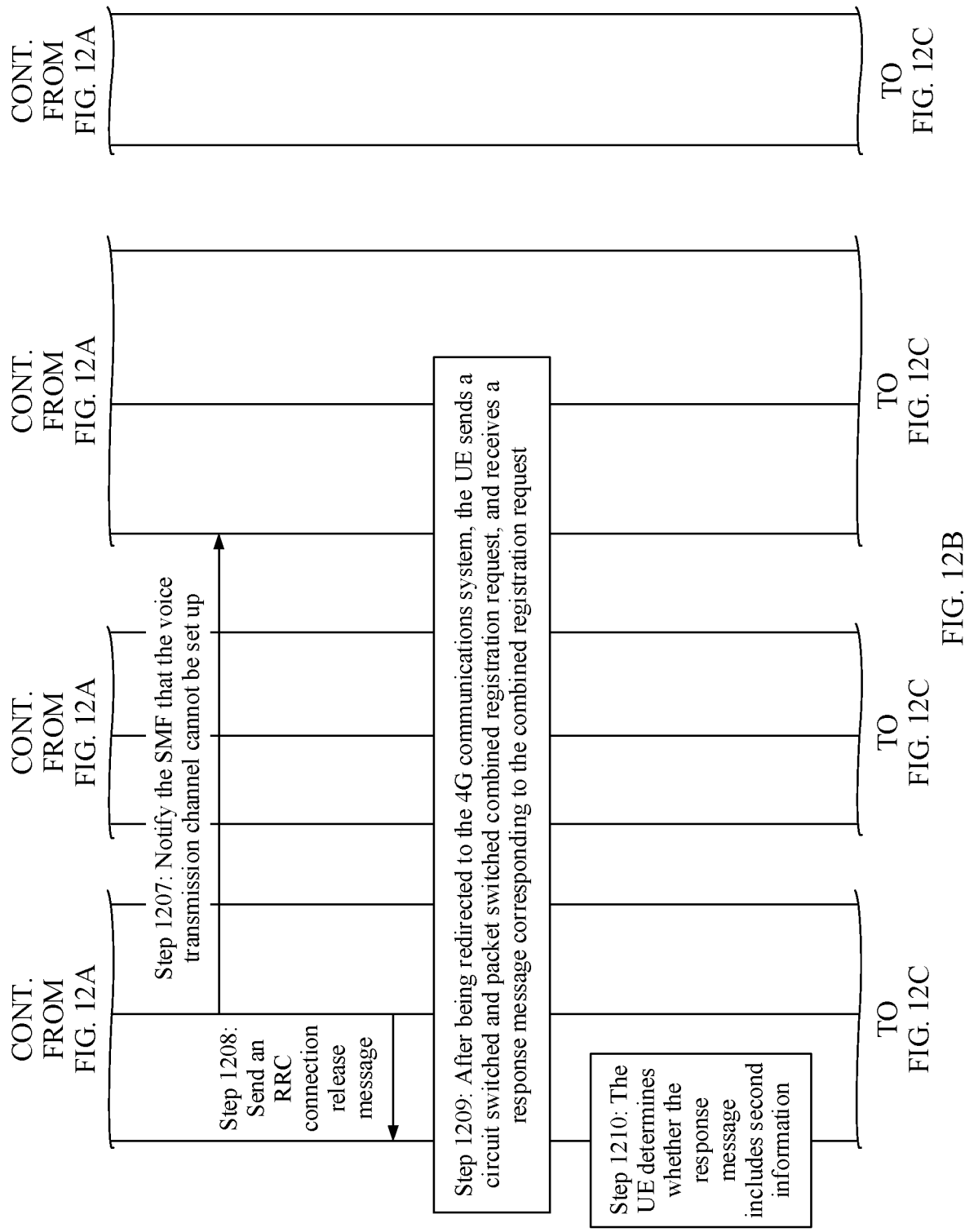

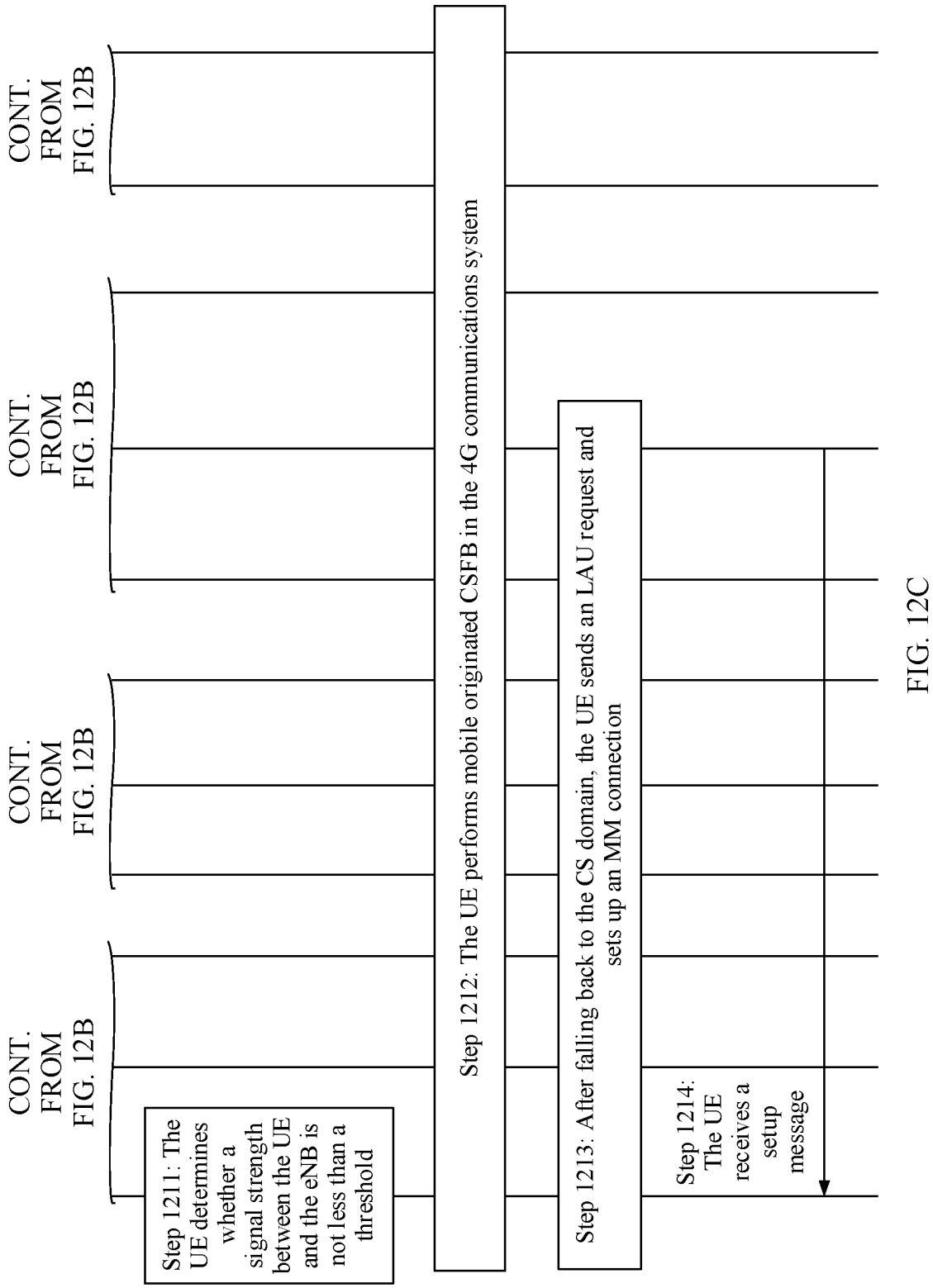

CIRCUIT SWITCHED FALLBACK METHOD AND APPARATUS

CROSS-REFERENCE TO RELATED APPLICATIONS

This application is a U.S. National Stage of International Patent Application No. PCT/CN2019/084422 filed on Apr. 26, 2019, which claims priority to Chinese Patent Application No. 201810385818.8 filed on Apr. 26, 2018 and Chinese Patent Application No. 201810850349.2 filed on Jul. 28, 2018. All of the aforementioned patent applications are hereby incorporated by reference in their entireties.

TECHNICAL FIELD

This application relates to the field of mobile communications technologies, and in particular, to a circuit switched fallback method and apparatus.

BACKGROUND

In the prior art, circuit switched fallback (circuit switched fallback, CSFB) is a solution in which user equipment (UE) is handed over from a 4G communications network to the circuit switched (circuit switched, CS) domain of a 3G communications network or to the CS domain of a 2G communications network to make a voice call.

Currently, if calling or called UE in a 5G communications system is handed over to a 4G communications system and cannot set up the call in the 4G communications system due to a limited condition of the 4G network after the handover, the UE may perform CSFB to fall back to the circuit switched domain, so as to call or be called. In the foregoing process, if UE that initiates a voice call in the 5G communications system is transferred to the 4G communications system, the UE needs to perform CSFB only after waiting for a message that is sent by the network side by using the 4G communications system and that is used to indicate to the UE that the voice call fails. If UE that receives a voice call in the 5G communications system is transferred to the 4G communications system, the UE needs to perform CSFB only after waiting for a message that is sent by the network side and that is used to indicate the UE to perform call terminated (or referred to as mobile terminated, MT) circuit switched fallback. In both processes, the UE has to wait for the message sent by the network side and then performs CSFB. As a result, user experience deteriorates because of the time-consuming voice call setup process.

SUMMARY

This application provides a circuit switched fallback method and apparatus, to resolve a time-consuming call setup problem when calling or called UE is handed over between communications systems.

According to a first aspect, an embodiment of this application provides a circuit switched fallback method. UE that initiates a call in a 5G communications system receives a first request. After the UE is transferred to a 4G communications system and before the UE receives a first message from the 4G communications system, if the UE determines that a voice call bearer cannot be set up in the 4G communications system, the UE initiates CSFB. The first message is used by the UE to determine that a call request fails. The first request indicates that the UE is to be transferred to the 4G communications system.

In the foregoing process in which the UE initiates the call, the UE may initiate the CSFB process after determining that the voice call bearer cannot be set up in the 4G communications system, without waiting for the first message sent by the 4G communications system, thereby shortening call setup duration.

In a possible design, the first request is a second message or a third message. The second message is used by the UE to determine that the UE is to be handed over (handover) to the 4G communications system. The third message is used by the UE to determine that the UE is to be redirected to the 4G communications system.

In a possible design, after the UE determines that at least one of the following is met, the UE may determine that the voice call bearer cannot be set up in the 4G communications system:

the UE determines that a received response message corresponding to a combined location update request carries first information, where the combined location update request is a circuit switched and packet switched combined location update request sent by the UE in the 4G communications system, and the first information is used by the UE to determine that an IP multimedia subsystem IMS voice service cannot be performed by using the 4G communications system; or the UE determines that a received response message corresponding to a combined registration request carries second information, where the combined registration request is a circuit switched and packet switched combined registration request sent by the UE in the 4G communications system, and the second information is used by the UE to determine that an IP multimedia subsystem IMS voice service cannot be performed by using the 4G communications system; or the UE determines that a signal strength between the UE and a base station in the 4G communications system is less than a threshold; or the UE determines that no measurement report greater than a threshold is sent to a base station in the 4G communications system; or the UE determines that no measurement report that is not less than a threshold is sent to a base station in the 4G communications system; or the UE determines that duration for receiving a second message reaches first preset duration, and that the UE does not receive a radio resource control RRC connection reconfiguration message, where the second message is used by the UE to determine that the UE is to be handed over handover to the 4G communications system; or the UE determines that duration for receiving a third message reaches second preset duration, and that the UE does not receive an RRC connection reconfiguration message, where the third message is used by the UE to determine that the UE is to be redirected to the 4G communications system; or the UE determines that duration for receiving a response message corresponding to a combined registration request reaches third preset duration, and that the UE does not receive an RRC connection reconfiguration message, where the combined registration request is a circuit switched and packet switched combined registration request sent by the UE in the 4G communications system. The RRC connection reconfiguration message is used by the UE to determine to set up the voice call bearer in the 4G communications system.

In a possible design, the UE may send, in the 4G communications system, an extended service request message whose service type is mobile originated, to initiate a CSFB process. Therefore, by setting the service type of the extended service request message, the UE enables a core network device that receives the extended service request message to accurately process the extended service request message.

According to a second aspect, an embodiment of this application provides a circuit switched fallback method. UE that receives a call request in a 5G communications system receives a second request. After the UE is transferred to a 4G communications system and before the UE receives a fourth message from the 4G communications system, if the UE determines that a voice call bearer cannot be set up in the 4G communications system, the UE initiates CSFB. The fourth message is used by the UE to initiate mobile terminated MT circuit switched fallback CSFB based on the fourth message.

In the foregoing process in which the UE receives the call, the UE may initiate the CSFB process after determining that the voice call bearer cannot be set up in the 4G communications system, without waiting for the fourth message sent by the 4G communications system, thereby shortening call setup duration.

In a possible design, the second request is a second message or a third message. The second message is used by the UE to determine that the UE is to be handed over to the 4G communications system. The third message is used by the UE to determine that the UE is to be redirected to the 4G communications system.

In a possible design, after the UE determines that at least one of the following is met, the UE may determine that the voice call bearer cannot be set up in the 4G communications system: the UE determines that a received response message corresponding to a combined location update request carries first information, where the combined location update request is a circuit switched and packet switched combined location update request sent by the UE in the 4G communications system, and the first information is used by the UE to determine that an IP multimedia subsystem IMS voice service cannot be performed by using the 4G communications system; or the UE determines that a received response message corresponding to a combined registration request carries second information, where the combined registration request is a circuit switched and packet switched combined registration request sent by the UE in the 4G communications system, and the second information is used by the UE to determine that an IP multimedia subsystem IMS voice service cannot be performed by using the 4G communications system; or the UE determines that a signal strength between the UE and a base station in the 4G communications system is less than a threshold; or the UE determines that no measurement report greater than a threshold is sent to a base station in the 4G communications system; or the UE determines that no measurement report that is not less than a threshold is sent to a base station in the 4G communications system; or the UE determines that duration for receiving a second message reaches first preset duration, and that the UE does not receive a radio resource control RRC connection reconfiguration message, where the second message is used by the UE to determine that the UE is to be handed over handover to the 4G communications system; or the UE determines that duration for receiving a third message reaches second preset duration, and that the UE does not receive an RRC connection reconfiguration message, where the third message is used by the UE to determine that the UE is to be redirected to the 4G communications system; or the UE determines that duration for receiving a response message corresponding to a combined registration request reaches third preset duration, and that the UE does not receive an RRC connection reconfiguration message, where the combined registration request is a circuit switched and packet switched combined registration request sent by the UE in the 4G communications system. The RRC connection reconfiguration message is used by the UE to determine to set up the voice call bearer in the 4G communications system.

In a possible design, the UE may send, in the 4G communications system, an extended service request message whose service type is mobile originated, to initiate a CSFB process. Therefore, by setting the service type of the extended service request message, the UE enables a core network device that receives the extended service request message to accurately process the extended service request message.

In a possible design, after initiating the circuit switched fallback in the 4G communications system, the UE may further initiate a location area update LAU in the circuit switched, to set up an MM connection by using the LAU, and wait for a call setup request message after setting up the MM connection. Alternatively, the UE may not initiate an LAU, but wait for a network paging message in the circuit switched domain, to wait for being called.

In a possible design, the UE may initiate an LAU in the circuit switched by sending an LAU request. The LAU request may carry a follow on (follow on) indication, and/or the LAU request may carry a circuit switched fallback mobile terminated call (circuit switched fallback mobile terminated call, CSMT) indication.

According to a third aspect, an embodiment of this application provides user equipment UE. The UE has a function of implementing behavior of the user equipment in the method provided in the first aspect or any possible design of the first aspect. The function may be implemented by hardware, or may be implemented by hardware executing corresponding software, or may be implemented by a combination of software and hardware. The hardware or the software includes one or more modules corresponding to the foregoing function.

An embodiment of this application provides another user equipment UE, including a request receiving module, a call bearer setup determining module, and a CSFB initiating module. The request receiving module is configured to: after the UE sends a call request in a first communications system, receive a first request sent by the first communications system. The first request indicates that the UE is to be transferred to a second communications system. The call bearer setup determining module is configured to: after the UE is transferred to the second communications system and before the UE receives a first message from the second communications system, determine that a voice call bearer cannot be set up in the second communications system. The first message is used by the UE to determine that the call request fails. The CSFB initiating module is configured to: when the UE determines that the voice call bearer cannot be set up in the second communications system, initiate circuit switched fallback CSFB in the second communications system. The first communications system is a 5G communications system, and the second communications system is a 4G communications system.

In a possible design, the first request may be a second message or a third message. The second message is used by the UE to determine that the UE is to be handed over to the 4G communications system. The third message is used by the UE to determine that the UE is to be redirected to the 4G communications system.

In a possible design, the call bearer setup determining module may be configured to: after at least one of the following is met, determine that the voice call bearer cannot be set up in the second communications system: it is determined that a response message that is received by the UE and that is corresponding to a combined location update request carries first information, where the combined location update request is a circuit switched and packet switched combined location update request sent by the UE in the second communications system, and the first information is used by the UE to determine that an IP multimedia subsystem IMS voice service cannot be performed by using the second communications system; or it is determined that a response message that is received by the UE and that is corresponding to a combined registration request carries second information, where the combined registration request is a circuit switched and packet switched combined registration request sent by the UE in the second communications system, and the second information is used by the UE to determine that an IP multimedia subsystem IMS voice service cannot be performed by using the second communications system; or it is determined that a signal strength between the UE and a base station in the second communications system is less than a threshold; or it is determined that the UE does not send a measurement report greater than a threshold to a base station in the second communications system; or it is determined that the UE does not send a measurement report that is not less than a threshold to a base station in the second communications system; or it is determined that duration in which the UE receives a second message reaches first preset duration, and that the UE does not receive a radio resource control RRC connection reconfiguration message, where the second message is used by the UE to determine that the UE is to be handed over to the second communications system; or it is determined that duration in which the UE receives a third message reaches second preset duration, and that the UE does not receive an RRC connection reconfiguration message, where the third message is used by the UE to determine that the UE is to be redirected to the 4G communications system; or it is determined that duration in which the UE receives a response message corresponding to a combined registration request reaches third preset duration, and that the UE does not receive an RRC connection reconfiguration message, where the combined registration request is a circuit switched and packet switched combined registration request sent by the UE in the second communications system. The RRC connection reconfiguration message is used by the UE to determine to set up the voice call bearer in the second communications system.

In a possible design, the CSFB initiating module is specifically configured to send an extended service request message in the second communications system, where a service type (Service type) of the extended service request message is mobile originated (mobile original, MO).

An embodiment of this application provides another user equipment UE, including a transmitter, a processor, and a receiver. The receiver may receive, after the UE sends a call request in a first communications system, a first request sent by the first communications system. The processor may be configured to: after the UE is transferred to a second communications system and before the UE receives a first message from the second communications system, determine that a voice call bearer cannot be set up in the second communications system. The first message is used to indicate that the UE is to be transferred to the second communications system. The transmitter may be configured to: when the UE determines that the voice call bearer cannot be set up in the second communications system, initiate circuit switched fallback CSFB in the second communications system. The first communications system is a 5G communications system, and the second communications system is a 4G communications system.

In a possible design, the first request may be a second message or a third message. The second message is used by the UE to determine that the UE is to be handed over to the 4G communications system. The third message is used by the UE to determine that the UE is to be redirected to the 4G communications system.

In a possible design, the processor may be configured to: after at least one of the following is met, determine that the voice call bearer cannot be set up in the second communications system: it is determined that a response message that is received by the UE and that is corresponding to a combined location update request carries first information, where the combined location update request is a circuit switched and packet switched combined location update request sent by the UE in the second communications system, and the first information is used by the UE to determine that an IP multimedia subsystem IMS voice service cannot be performed by using the second communications system; or it is determined that a response message that is received by the UE and that is corresponding to a combined registration request carries second information, where the combined registration request is a circuit switched and packet switched combined registration request sent by the UE in the second communications system, and the second information is used by the UE to determine that an IP multimedia subsystem IMS voice service cannot be performed by using the second communications system; or it is determined that a signal strength between the UE and a base station in the second communications system is less than a threshold; or it is determined that the UE does not send a measurement report greater than a threshold to a base station in the second communications system; or it is determined that the UE does not send a measurement report that is not less than a threshold to a base station in the second communications system; or it is determined that duration in which the UE receives a second message reaches first preset duration, and that the UE does not receive a radio resource control RRC connection reconfiguration message, where the second message is used by the UE to determine that the UE is to be handed over handover to the second communications system; or it is determined that duration in which the UE receives a third message reaches second preset duration, and that the UE does not receive an RRC connection reconfiguration message, where the third message is used by the UE to determine that the UE is to be redirected to the 4G communications system; or it is determined that duration in which the UE receives a response message corresponding to a combined registration request reaches third preset duration, and that the UE does not receive an RRC connection reconfiguration message, where the combined registration request is a circuit switched and packet switched combined registration request sent by the UE in the second communications system. The RRC connection reconfiguration message is used by the UE to determine to set up the voice call bearer in the second communications system.

In a possible design, when initiating CSFB, the transmitter may send an extended service request message in the second communications system, where a service type of the extended service request message is mobile originated.

According to a fourth aspect, an embodiment of this application provides user equipment UE. The UE has a function of implementing behavior of the user equipment in the method provided in the second aspect or any possible design of the second aspect. The function may be implemented by hardware, or may be implemented by hardware executing corresponding software, or may be implemented by a combination of software and hardware. The hardware or the software includes one or more modules corresponding to the foregoing function.

An embodiment of this application provides UE, including a request receiving module, a call bearer setup determining module, and a CSFB initiating module. The request receiving module is configured to: after the UE receives a call request in a first communications system, receive a second request sent by the first communications system. The second request indicates that the UE is to be transferred to a second communications system. The call bearer setup determining module is configured to: after the UE is transferred to the second communications system and before the UE receives a fourth message from the second communications system, determine that a voice call bearer cannot be set up in the second communications system. The fourth message is used by the UE to initiate mobile terminated MT circuit switched fallback CSFB based on the fourth message. The CSFB initiating module is configured to: when the UE determines that the voice call bearer cannot be set up in the second communications system, initiate circuit switched fallback CSFB in the second communications system. The first communications system is a 5G communications system, and the second communications system is a 4G communications system.

In a possible design, the second request is a second message or a third message. The second message is used by the UE to determine that the UE is to be handed over to the 4G communications system. The third message is used by the UE to determine that the UE is to be redirected to the 4G communications system.

In a possible design, the call bearer setup determining module may be configured to: after at least one of the following is met, determine that the voice call bearer cannot be set up in the second communications system: it is determined that a response message that is received by the UE and that is corresponding to a combined location update request carries first information, where the combined location update request is a circuit switched and packet switched combined location update request sent by the UE in the second communications system, and the first information is used by the UE to determine that an IP multimedia subsystem IMS voice service cannot be performed by using the second communications system; or it is determined that a response message that is received by the UE and that is corresponding to a combined registration request carries second information, where the combined registration request is a circuit switched and packet switched combined registration request sent by the UE in the second communications system, and the second information is used by the UE to determine that an IP multimedia subsystem IMS voice service cannot be performed by using the second communications system; or it is determined that a signal strength between the UE and a base station in the second communications system is less than a threshold; or it is determined that the UE does not send a measurement report greater than a threshold to a base station in the second communications system; or it is determined that the UE does not send a measurement report that is not less than a threshold to a base station in the second communications system; or it is determined that duration in which the UE receives a second message reaches first preset duration, and that the UE does not receive a radio resource control RRC connection reconfiguration message, where the second message is used by the UE to determine that the UE is to be handed over handover to the second communications system; or it is determined that duration in which the UE receives a third message reaches second preset duration, and that the UE does not receive an RRC connection reconfiguration message, where the third message is used by the UE to determine that the UE is to be redirected to the 4G communications system; or it is determined that duration in which the UE receives a response message corresponding to a combined registration request reaches third preset duration, and that the UE does not receive an RRC connection reconfiguration message, where the combined registration request is a circuit switched and packet switched combined registration request sent by the UE in the second communications system. The RRC connection reconfiguration message is used by the UE to determine to set up the voice call bearer in the second communications system.

In a possible design, when initiating CSFB, the CSFB initiating module may send an extended service request message in the second communications system, where a service type service type of the extended service request message is mobile originated MO.

In a possible design, the UE may further include an LAU initiating module, configured to initiate a location area update LAU in the circuit switched domain. Alternatively, the UE may further include a network paging message receiving module, configured to receive a network paging message in the circuit switched domain. Therefore, the UE may initiate a location area update LAU by using the LAU initiation module, to set up an MM connection by using the LAU process, and wait for a call setup request message after setting up the MM connection; or the UE may receive a network paging message in the circuit switched domain by using the network paging message receiving module, to be called.

In a possible design, when initiating a location area update LAU in the circuit switched domain, the LAU initiating module may be configured to send an LAU request. The LAU request may carry a follow on follow on indication and/or the LAU request may carry a circuit switched fallback mobile terminated call CSMT indication.

An embodiment of this application provides another user equipment UE, including a transmitter, a processor, and a receiver. The receiver may be configured to: after the UE receives a call request in a first communications system, receive a second request sent by the first communications system. The second request indicates that the UE is to be transferred to a second communications system. The processor may be configured to: after the UE is transferred to the second communications system and before the UE receives a fourth message from the second communications system, determine that a voice call bearer cannot be set up in the second communications system. The fourth message is used by the UE to initiate mobile terminated MT circuit switched fallback CSFB based on the fourth message. The transmitter may be configured to: when the UE determines that the voice call bearer cannot be set up in the second communications system, initiate circuit switched fallback CSFB in the second communications system. The first communications system is a 5G communications system, and the second communications system is a 4G communications system.

In a possible design, the second request may be a second message or a third message. The second message is used by the UE to determine that the UE is to be handed over to the second communications system. The third message is used by the UE to determine that the UE is to be redirected to the second communications system.

In a possible design, the processor is specifically configured to: after at least one of the following is met, determine that the voice call bearer cannot be set up in the second communications system: it is determined that a response message that is received by the UE and that is corresponding to a combined location update request carries first information, where the combined location update request is a circuit switched and packet switched combined location update request sent by the UE in the second communications system, and the first information is used by the UE to determine that an IP multimedia subsystem IMS voice service cannot be performed by using the second communications system; or it is determined that a response message that is received by the UE and that is corresponding to a combined registration request carries second information, where the combined registration request is a circuit switched and packet switched combined registration request sent by the UE in the second communications system, and the second information is used by the UE to determine that an IP multimedia subsystem IMS voice service cannot be performed by using the second communications system; or it is determined that a signal strength between the UE and a base station in the second communications system is less than a threshold; or it is determined that the UE does not send a measurement report greater than a threshold to a base station in the second communications system; or it is determined that the UE does not send a measurement report that is not less than a threshold to a base station in the second communications system; or it is determined that duration in which the UE receives a second message reaches first preset duration, and that the UE does not receive a radio resource control RRC connection reconfiguration message, where the second message is used by the UE to determine that the UE is to be handed over handover to the second communications system; or it is determined that duration in which the UE receives a third message reaches second preset duration, and that the UE does not receive an RRC connection reconfiguration message, where the third message is used by the UE to determine that the UE is to be redirected to the 4G communications system; or it is determined that duration in which the UE receives a response message corresponding to a combined registration request reaches third preset duration, and that the UE does not receive an RRC connection reconfiguration message, where the combined registration request is a circuit switched and packet switched combined registration request sent by the UE in the second communications system. The RRC connection reconfiguration message is used by the UE to determine to set up the voice call bearer in the second communications system.

In a possible design, when initiating CSFB, the transmitter may send an extended service request message in the second communications system, where a service type of the extended service request message is mobile originated.

In a possible design, the transmitter may be further configured to initiate a location area update LAU in the circuit switched domain, or the receiver may be further configured to receive a network paging message in the circuit switched domain. Therefore, the UE may initiate a location area update LAU by using the transmitter, to set up an MM connection by using the LAU process, and wait for a call setup request message after setting up the MM connection; or the UE may receive a network paging message in the circuit switched domain by using the receiver, to be called.

In a possible design, when initiating a location area update LAU in the circuit switched domain, the transmitter may be configured to send an LAU request. The LAU request may carry a follow on follow on indication and/or the LAU request may carry a circuit switched fallback mobile terminated call CSMT indication.

According to a fifth aspect, an embodiment of this application provides a computer program product, including a computer program. When the computer program is executed on a computer or a processor, the computer or the processor is enabled to implement a function in the method embodiment in the first aspect or any possible design of the method embodiment.

According to a sixth aspect, an embodiment of this application provides a computer readable storage medium, configured to store a program and an instruction. When the program and the instruction are invoked and executed in a computer, the computer is enabled to perform a function in the method embodiment in the first aspect or any possible design of the method embodiment.

According to a seventh aspect, an embodiment of this application provides a chip. The chip may be coupled to a transceiver, and is configured to perform a function in the method embodiment in the first aspect or any possible design of the method embodiment, or configured to perform a function in the method embodiment in the second aspect or any possible design of the method embodiment.

BRIEF DESCRIPTION OF DRAWINGS

FIG. 1A and FIG. 1B are an example of a schematic flowchart of CSFB in an originating scenario in the prior art;

FIG. 2A to FIG. 2C are another example of a schematic flowchart of CSFB in an originating scenario in the prior art;

FIG. 3A to FIG. 3C are an example of a schematic flowchart of CSFB in a terminating scenario in the prior art;

FIG. 4A to FIG. 4C are another example of a schematic flowchart of CSFB in a terminating scenario in the prior art;

FIG. 9A and FIG. 9B are an example of a schematic flowchart of a circuit switched fallback method in an originating scenario according to an embodiment of this application;

FIG. 10A and FIG. 10B are another example of a schematic flowchart of a circuit switched fallback method in an originating scenario according to an embodiment of this application;

FIG. 11A to FIG. 11C are an example of a schematic flowchart of a circuit switched fallback method in a terminating scenario according to an embodiment of this application;

FIG. 12A to FIG. 12C are another example of a schematic flowchart of a circuit switched fallback method in a terminating scenario according to an embodiment of this application;

DESCRIPTION OF EMBODIMENTS

Figure 2C:
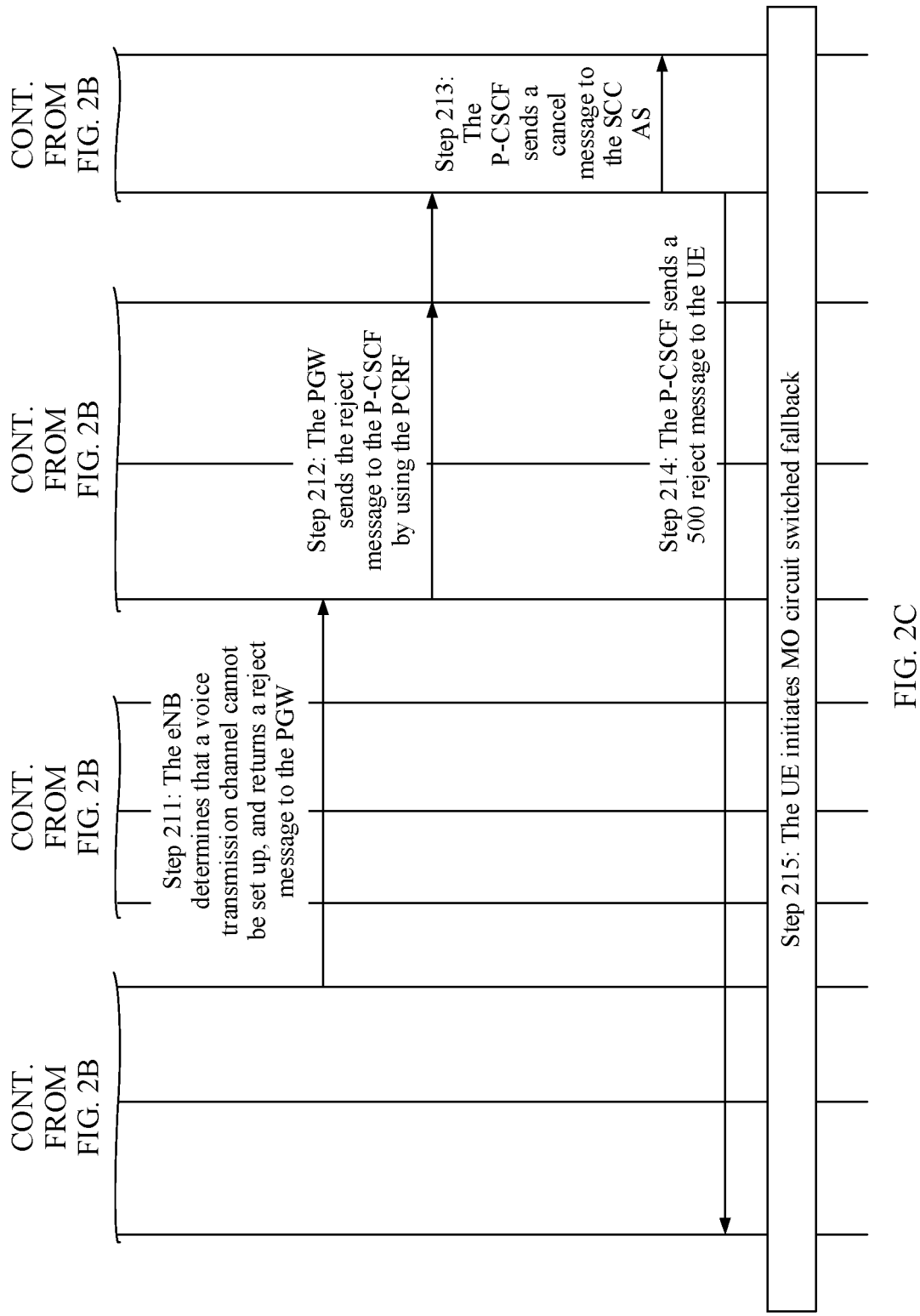

To make the objectives, technical solutions, and advantages of this application clearer, the following further describes this application in detail with reference to the accompanying drawings.

The following explains terms used or possibly used in this application.

At least one means one or more, that is, includes one, two, three, or more.

Carrying may mean that a message is used to carry information or data, or may mean that a message is formed by information.

In addition, in the description of this application, unless otherwise stated, "a plurality of" means two or more than two. It should also be understood that in the descriptions of the embodiments of this application, terms such as "first" and "second" are merely used for distinguishing and description, and cannot be understood as an indication or implication of relative importance, or an indication or implication of a sequence.

Currently, after UE in a 5G communications system proactively initiates a call, the UE may be handed over to a 4G communications system and the UE cannot set up a voice call bearer in 4G. At this time, the UE initiates CSFB. This process is shown in FIG. 1A and FIG. 1B.

Step 101: UE 600 in the 5G communications system initiates IP multimedia subsystem (IP multimedia subsystem, IMS) originating signaling. The IMS originating signaling is sent to a service centralization and continuity application server (service call continuity application server, SCC AS). The IMS originating signaling may carry information such as information about a voice coding scheme supported by the UE, IP address information of the UE, and a port number of the UE.

Step 102: A proxy-call session control function (proxy-call session control function, P-CSCF) receives a 183 message that is sent by a call peer device by using an IMS server. The IMS server herein may be an SCC AS. The 183 message is a response message sent by the called end device after the called end device receives a call request.

Step 103: The P-CSCF sends a voice transmission channel setup request to a session management function (session management function, SMF) entity, which is a network element in the 5G communications system, by using a policy control function (policy control function, PCF)/policy and charging rules function (policy and charging rules function, PCRF).

Step 104: The SMF sends the voice transmission channel setup request to an NG RAN by using an access and mobility management function (access and mobility management function, AMF). The NG RAN is referred to as a 5G base station.

Step 105: The NG RAN determines that a voice transmission channel cannot be set up.

Step 106: The NG RAN indicates the UE to perform 4G signal measurement, and sends, to the UE, a request message that the UE is to be handed over (handover) to the 4G communications system.

Step 107: The NG RAN notifies, by using the AMF, the SMF that the voice transmission channel cannot be set up. The NG RAN may send an N2 message (message) to the AMF, to indicate that setup of a quality of service (quality of service, QoS) data flow is rejected due to IMS voice fallback. The AMF may send, to the SMF, an SM request that carries a PDU modification command acknowledgment character (SM request with PDU modification command ack).

Step 108: After the UE is handed over to the 4G communications system, the UE performs a process of a long term evolution (long term evolution, LTE) and CS domain combined tracking area update (tracking area update, TAU).

Step 109: A PDN gateway (PDN GateWay, PGW) sends a voice transmission channel setup request to a 4G base station eNB, to re-initiate a voice transmission channel setup request in 4G.

Step 110: If the eNB determines that a voice transmission channel cannot be setup, the eNB returns a reject message to the PGW.

Step 111: The PGW sends the reject message to the P-CSCF by using the PCRF.

Step 112: The P-CSCF sends a cancel (Cancel) message to the SCC AS to notify the SCC AS that the call is cancelled.

Step 113: The P-CSCF sends, to the UE, a message used by the UE to determine that a voice call cannot be set up in the 4G system, for example, sends a 500 reject message.

Step 114: After receiving the message used by the UE to determine that the voice call cannot be set up in the 4G system, the UE initiates CSFB in the LTE.

After UE in a 5G communications system proactively initiates a call, the UE may be handed over to a 4G communications system and the UE cannot set up a voice call bearer in 4G. Another CSFB process performed at this time is shown in FIG. 2A to FIG. 2C.

Step 201: UE 600 in the 5G communications system initiates IMS originating signaling. The IMS originating signaling is sent to an SCC AS. The IMS originating signaling may carry information such as information about a voice coding scheme supported by the UE, IP address information of the UE, and a port number of the UE.

Step 202: A P-CSCF receives a 183 message sent by a call peer device by using an IMS server. The IMS server herein may be an SCC AS. The 183 message is a response message sent by the called end device after the called end device receives a call request.

Step 203: The P-CSCF sends a voice transmission channel setup request to an SMF in the 5G communications system by using a PCF/PCRF.

Step 204: The SMF sends the voice transmission channel setup request to an NG RAN by using an AMF. The NG RAN is referred to as a 5G base station.

Step 205: The NG RAN determines that a voice transmission channel cannot be set up.

Step 206: The NG RAN indicates the UE to perform 4G signal measurement, and sends, to the UE, a request message that the UE is to be handed over to the 4G communications system.

Step 207: The NG RAN notifies, by using the AMF, the SMF that the voice transmission channel cannot be set up. The NG RAN may send an N2 message to the AMF 201, to indicate that setup of a QoS data flow is rejected due to IMS voice fallback. The AMF 201 may send, to the SMF, an SM request that carries a PDU modification command acknowledgment character.

Step 208: The NG RAN sends an RRC connection release message to the UE, to redirect the UE from the 5G communications system to the 4G communications system.

Step 209: After receiving the RRC connection release message, the UE reselects a 4G base station, sends a CS/PS domain combined registration request, and adds a handover indication to the combined registration message.

Step 210: A PGW sends a voice transmission channel setup request to the 4G base station eNB, to re-initiate a voice transmission channel setup request in 4G.

Step 211: If the eNB determines that a voice transmission channel cannot be set up, the eNB returns a reject message to the PGW.

Step 212: The PGW sends the reject message to the P-CSCF by using the PCRF.

Step 213: The P-CSCF sends a cancel message to the SCC AS to notify the SCC AS that the call is cancelled.

Step 214: The P-CSCF sends, to the UE, a message used by the UE to determine that a voice call cannot be set up in the 4G system, for example, sends a 500 reject message.

Step 215: After receiving the message used by the UE to determine that the voice call cannot be set up in the 4G system, the UE initiates CSFB in the LTE.

It can be learned that, in the CSFB procedures initiated by the calling UE shown in FIG. 1A and FIG. 1B and FIG. 2A to FIG. 2C, the UE can initiate CSFB only after receiving the message used by the UE to determine that the voice call cannot be set up in the 4G system, and then set up the call in the circuit domain. The process of waiting for the message causes a long time for the UE to initiate CSFB, and consequently a long time for call setup.

Figure 3C:
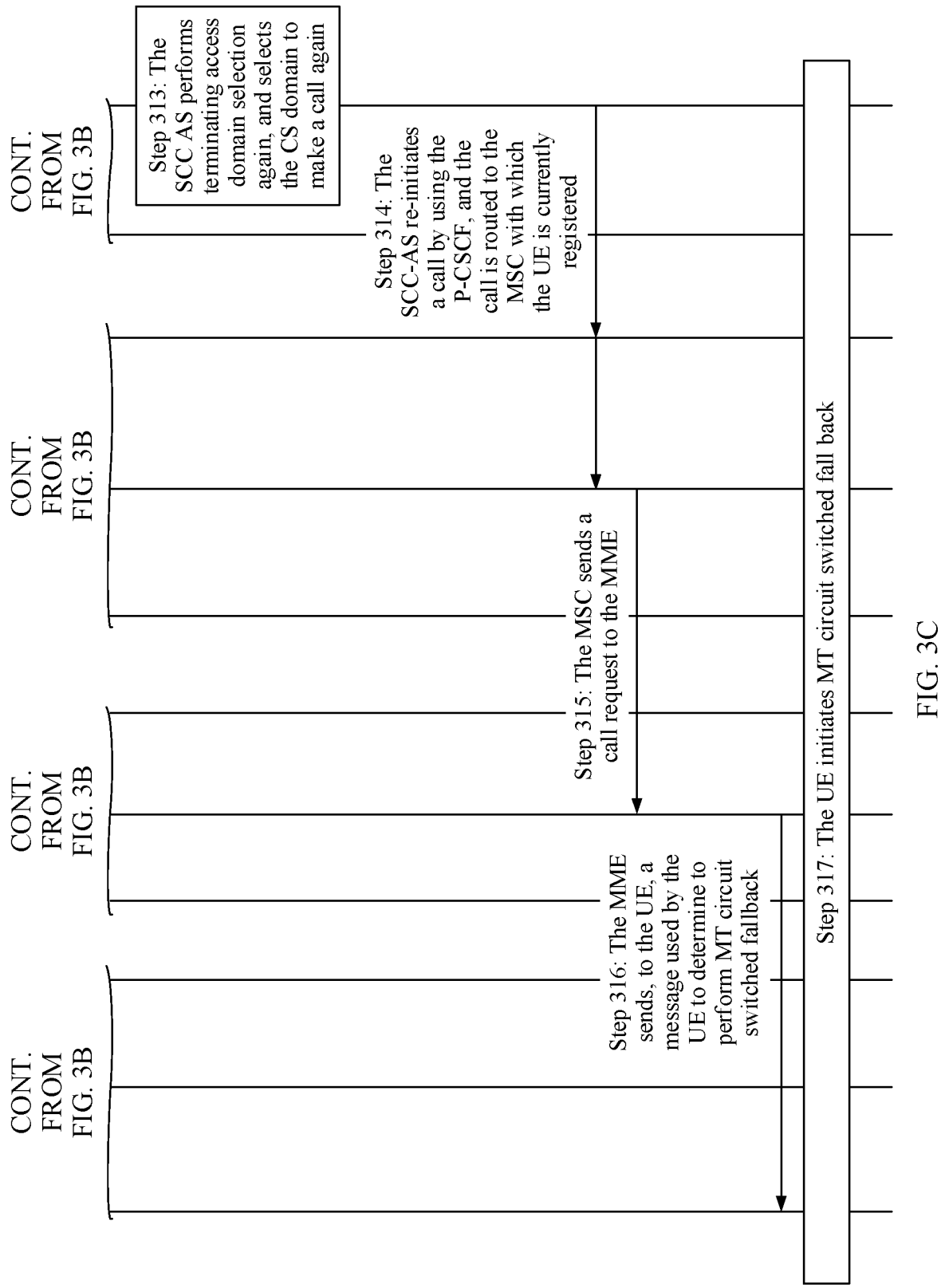

In addition, currently, after UE in a 5G communications system receives a call request, the UE may be handed over to a 4G communications system and the UE cannot set up a voice call bearer in 4G. At this time, the UE initiates CSFB. This process is shown in FIG. 3A to FIG. 3C.

Step 301: UE 600 in the 5G communications system receives IMS terminating signaling. The IMS terminating signaling is sent by an SCC AS. The IMS terminating signaling may carry information such as information about a voice coding scheme supported by a call peer device, IP address information of the call peer device, and a port number of the call peer device.

Step 302: The UE 600 sends a 183 message to a P-CSCF. The 183 message may carry information about a coding scheme selected by the UE 600, and the like.

Step 303: The P-CSCF sends a voice transmission channel setup request to an SMF in the 5G communications system by using a PCF/PCRF.

Step 304: The SMF sends the voice transmission channel setup request to an NG RAN by using an AMF.

Step 305: The NG RAN determines that a voice transmission channel cannot be set up.

Step 306: The NG RAN indicates the UE to perform 4G signal measurement, and sends, to the UE, a request message that the UE is to be handed over to the 4G communications system.

Step 307: The NG RAN notifies, by using the AMF, the SMF that the voice transmission channel cannot be set up. The NG RAN may send an N2 message to the AMF 301, to indicate that setup of a QoS data flow is rejected due to IMS voice fallback. The AMF may send, to the SMF, an SM request that carries a PDU modification command acknowledgment character.

Step 308: After the UE is handed over to the 4G communications system, the UE performs a TAU process in LTE and the CS domain.

Step 309: A PGW sends a voice transmission channel setup request to an eNB, to re-initiate a voice transmission channel setup request in 4G.

Step 310: If the eNB determines that a voice transmission channel cannot be set up, the eNB returns a reject message to the PGW.

Step 311: The PGW sends the reject message to the P-CSCF by using the PCRF.

Step 312: The P-CSCF sends the reject message to the SCC AS.

Step 313: The SCC AS performs terminating access domain selection again, and selects the CS domain to make a call again.

Step 314: The SCC AS re-initiates a call by using the P-CSCF, and the call is routed to a mobile switching center (mobile switching center, MSC) with which the UE is currently registered.

Step 315: The MSC sends a call request to a mobility management entity (mobile management entity, MME).

Step 316: The MME sends, to the UE, a message used by the UE to determine to perform MT CSFB. The message may be a call request in the circuit domain.

Step 317: After receiving the message used by the UE to determine to perform MT CSFB, the UE initiates MT CSFB.

Figure 4B:
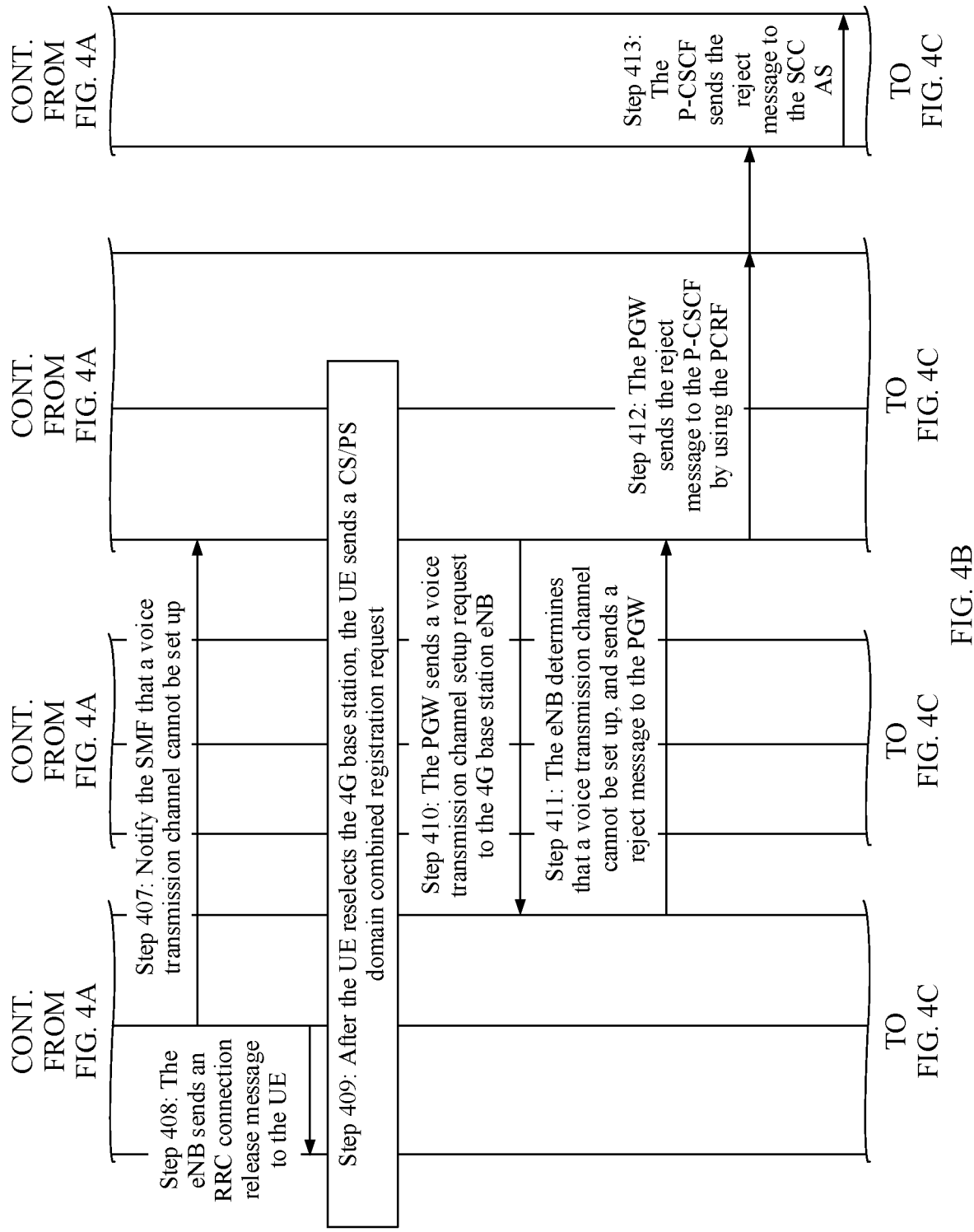
Figure 4C:
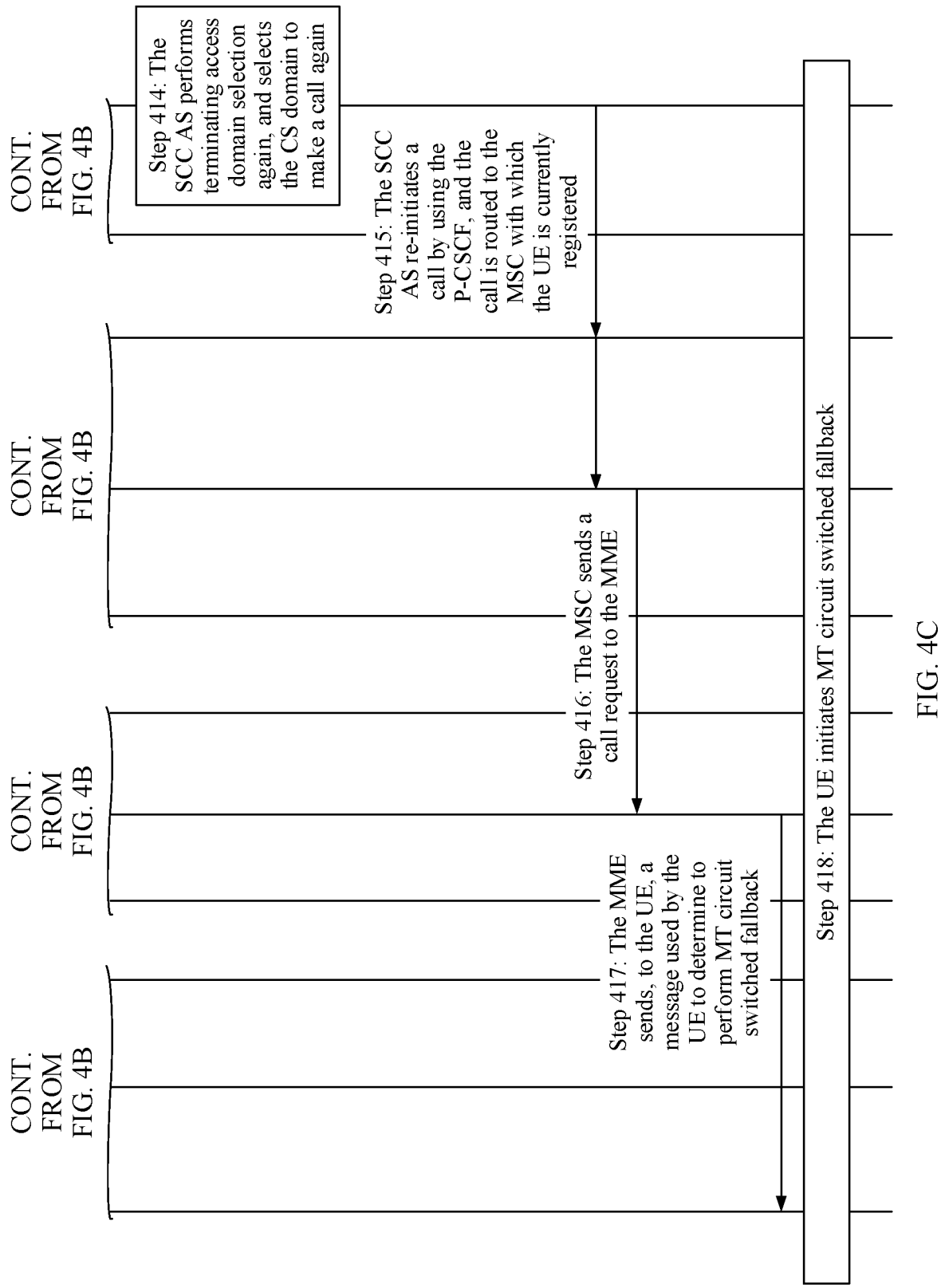

After UE in a 5G communications system receives a call request, the UE may be handed over to a 4G communications system and the UE cannot set up a voice call bearer in 4G. Another CSFB process performed at this time is shown in FIG. 4A to FIG. 4C.

Step 402: UE 600 sends a 183 message to a P-CSCF. The 183 message may carry information about a coding scheme selected by the UE 600, and the like.

Step 403: The P-CSCF sends a voice transmission channel setup request to an SMF in the 5G communications system by using a PCF/PCRF.

Step 404: The SMF sends the voice transmission channel setup request to an NG RAN by using an AMF.

Step 405: The NG RAN determines that a voice transmission channel cannot be set up.

Step 406: The NG RAN indicates the UE to perform 4G signal measurement, and sends, to the UE, a request message that the UE is to be handed over to the 4G communications system.

Step 407: The NG RAN notifies, by using the AMF, the SMF that the voice transmission channel cannot be set up. The NG RAN may send an N2 message to the AMF 401, to indicate that setup of a QoS data flow is rejected due to IMS voice fallback. The AMF may send, to the SMF, an SM request that carries a PDU modification command acknowledgment character.

Step 408: The NG RAN sends an RRC connection release message to the UE, to redirect the UE from the 5G communications system to the 4G communications system.

Step 409: After receiving the RRC connection release message, the UE reselects a 4G base station, sends a CS/PS domain combined registration request, and adds a handover indication to the combined registration message.

Step 410: A PGW sends a voice transmission channel setup request to the eNB, to re-initiate a voice transmission channel setup request in 4G.

Step 411: If the eNB determines that a voice transmission channel cannot be set up, the eNB returns a reject message to the PGW.

Step 412: The PGW sends the reject message to the P-CSCF by using the PCRF.

Step 413: The P-CSCF sends the reject message to an SCC AS.

Step 414: The SCC AS performs terminating access domain selection again, and selects the CS domain to make a call again.

Step 415: The SCC AS re-initiates a call by using the P-CSCF, and the call is routed to an MSC with which the UE currently registers.

Step 416: The MSC initiates a call request to an MME.

Step 417: The MME sends, to the UE, a message used by the UE to determine to perform MT CSFB. The message may be a call request in the circuit domain.

Step 418: After receiving the message used by the UE to determine to perform MT CSFB, the UE initiates MT CSFB.

It can be learned that, in the CSFB procedures initiated by the called UE shown in FIG. 3A to FIG. 3C and FIG. 4A to FIG. 4C, the UE can initiate CSFB only after receiving the message that is sent by the MME and that is used by the UE to determine to perform MT CSFB, and then set up the call in the circuit domain. The process of waiting for the message causes a long time for the UE to initiate CSFB, and consequently a long time for call setup.

To resolve the time-consuming call setup problem caused when the UE initiates the CSFB process shown in FIG. 1A and FIG. 1B, FIG. 2A to FIG. 2C, FIG. 3A to FIG. 3C, and FIG. 4A to FIG. 4C, the embodiments of this application provide a circuit switched fallback method and apparatus.

The following describes the embodiments of this application in detail with reference to accompanying drawings. First, a communications system provided in the embodiments of this application is described. Then, UE provided in the embodiments of this application is described. Finally, specific implementations of the circuit switched fallback method provided in the embodiments of this application are described.

Figure 5:
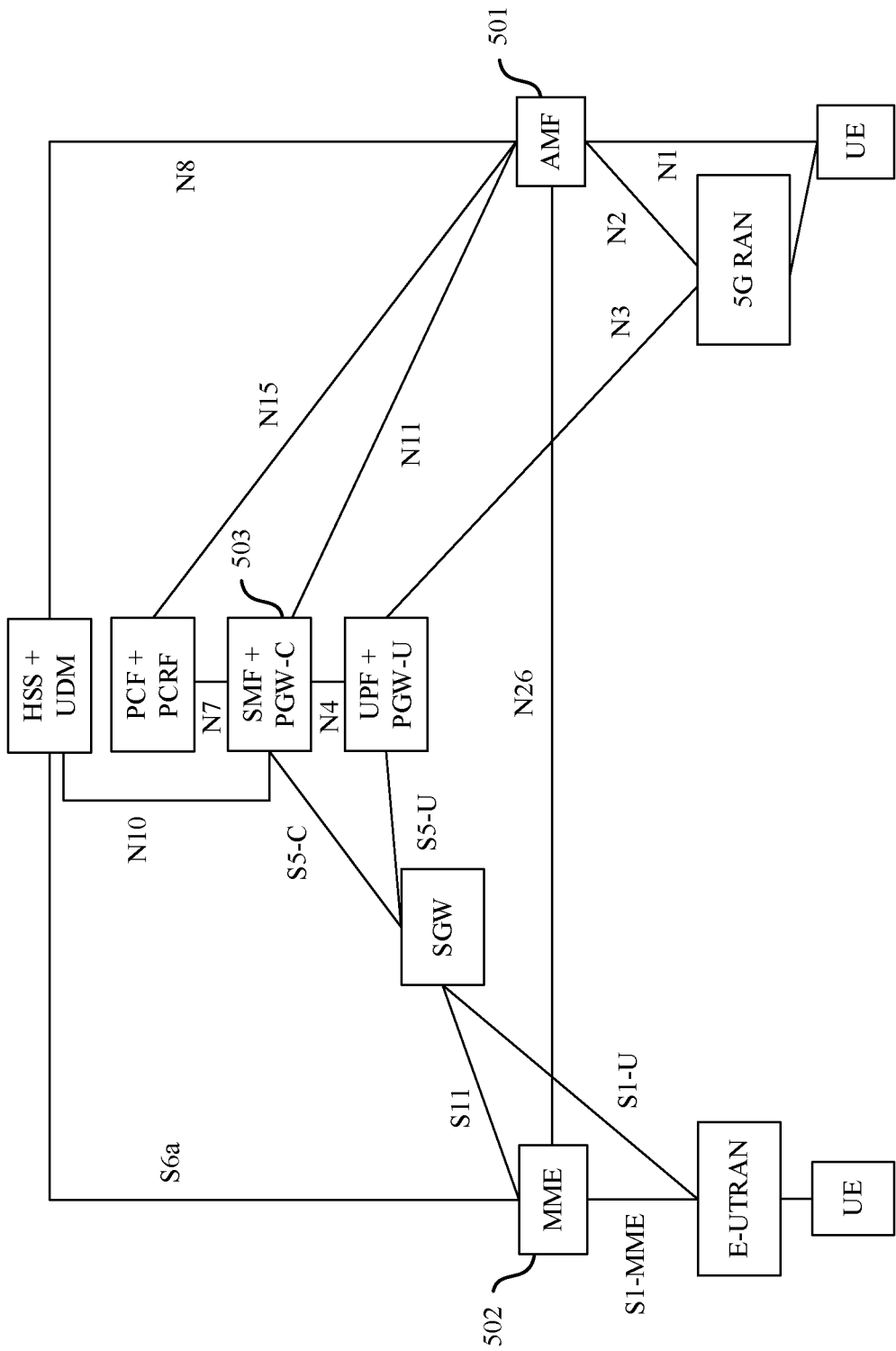
FIG. 5 is an example of a schematic architectural diagram of a communications system according to an embodiment of this application.

A communications system to which the circuit switched fallback method provided in the embodiments of this application is applicable may be a 5G communications system. As shown in FIG. 5, when UE moves between 4G and 5G, context (context) of the UE may be transferred between a 5G core network element AMF 501 and a 4G core network element MME 502 through an N26 interface, so that the UE may be seamlessly transferred from a communications system in which the UE is located to another communications system. The UE may keep the same Internet Protocol (internet protocol, IP) address in the communications system after transfer, and a PGW-C (PDN GateWay, PDN gateway) corresponding to the UE remains unchanged. When a public data network (public data network, PDN) connection (PDN connection) set up by the UE in 4G is being seamlessly transferred to 5G, the MME 502 may select, for the UE, an SMF+PGW-C 503 that is suitable for both 5G and 4G, so that the PGW-C corresponding to the UE remains unchanged.

It should be noted that if a first communications system in the embodiments of this application may be a 5G communications system, a second communications system is a 4G communications system. If a first communications system may be a 4G communications system, a second communications system is a 5G communications system.

The circuit switched fallback method provided in the embodiments of this application is applicable to UE 600. The UE 600 may have a structure shown in FIG. 6. It can be seen that the UE 600 may include a processor 601. The processor 601 may be configured to support the UE 600 in implementing steps related to the UE 600 in the circuit switched fallback method provided in the embodiments of this application, for example, configured to enable the UE 600 to determine that a voice call bearer cannot be set up in a second communications system. For example, the UE 600 may further have a transceiver 603. The transceiver 603 may be used by the UE 600 to receive and/or send a message (or data), for example, used by the UE 600 to receive a first request or a second request, or used by the UE 600 to initiate CSFB in a first communications system, or used by the UE 600 to receive a response message, a first message, a second message, a third message, a fourth message, or the like in the circuit switched fallback method provided in the embodiments of this application. For example, the transceiver 602 in the UE 600 may include a transmitter and a receiver. The transmitter may be configured to implement a sending function of the transceiver 602, and the receiver may be configured to implement a receiving function of the transceiver 602. For example, the UE 600 may further include a memory 603 that stores a computer program and an instruction. The memory 603 may be coupled to the processor 601, and is configured to support the processor 601 in invoking the computer program and the instruction in the memory 603, to implement steps related to the UE 600 in the circuit switched fallback method provided in the embodiments of this application. In addition, the memory 602 may be further configured to store data.

It should be understood that the processor 601 in the UE 600 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in the embodiments of this application. Alternatively, the processor may be a combination of processors implementing a computing function, for example, a combination of one or more microprocessors, or a combination of the digital signal processor and a microprocessor.

During implementation, the UE 600 can use a voice service in a 5G communications system. The UE 600 needs to be a device such as a terminal (Terminal), a mobile station (MS, Mobile Station), or a mobile terminal (Mobile Terminal). The UE 600 can communicate with a core network entity in one or more communications systems, and receive a network service provided by the core network entity. For example, the UE 600 in the embodiments of this application may be a mobile phone (or referred to as a "cellular" phone), a computer with a mobile terminal, or the like. Alternatively, the UE 600 may be a portable, pocket-sized, handheld, computer built-in, or in-vehicle mobile apparatus. Alternatively, the UE 600 may be a communications chip having a communications module.

Figure 7:
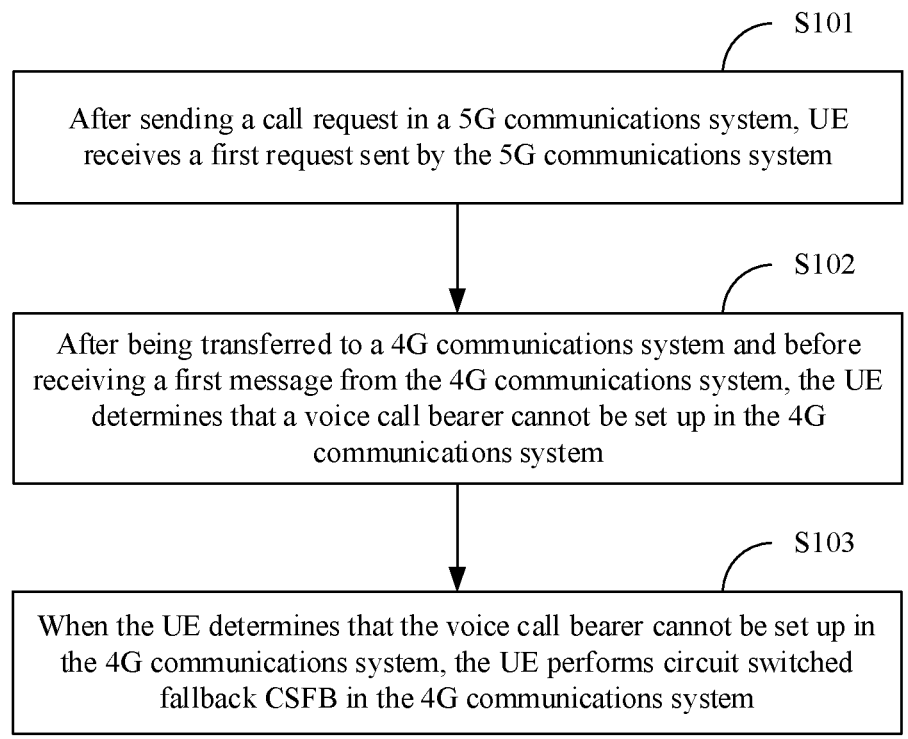
FIG. 7 is an example of a schematic flowchart of a circuit switched fallback method according to an embodiment of this application.

The following describes, with reference to FIG. 7, a circuit switched fallback method provided in the embodiments of this application by using an example in which a first communications system is a 5G communications system and a second communications system is a 4G communications system. The method includes the following steps:

Step S101: After sending a call request in the 5G communications system, UE 600 receives a first request sent by the 5G communications system. The first request indicates that the UE 600 is to be transferred to the 4G communications system.

Step S102: After being transferred to the 4G communications system and before receiving a first message from the 4G communications system, the UE 600 determines that a voice call bearer cannot be set up in the 4G communications system. The first message is used by the UE 600 to determine that the call request fails. During implementation, the first message herein may be a 500 reject message sent by a P-CSCF to the UE.

Step S103: The UE 600 initiates CSFB in the 4G communications system when determining that the voice call bearer cannot be set up in the 4G communications system.

In this method, after the UE 600 in the 5G communications system sends the call request, if the UE 600 is transferred to the 4G communications system, the UE 600 can initiate CSFB in step S103 after determining in step S102 that the voice call bearer cannot be set up in the 4G communications system. In this method compared with the method for initiating CSFB shown in FIG. 1A and FIG. 1B, after performing step 108, the UE may initiate CSFB without waiting for the 500 reject message sent by the P-CSCF in step 113. Therefore, call setup waiting duration of the UE 600 is shortened. In this method compared with the method for initiating CSFB shown in FIG. 2A to FIG. 2C, after performing step 209, the UE may initiate CSFB without waiting for the 500 reject message sent by the P-CSCF in step 214. Therefore, call setup waiting duration of the UE 600 is shortened.

Figure 8:
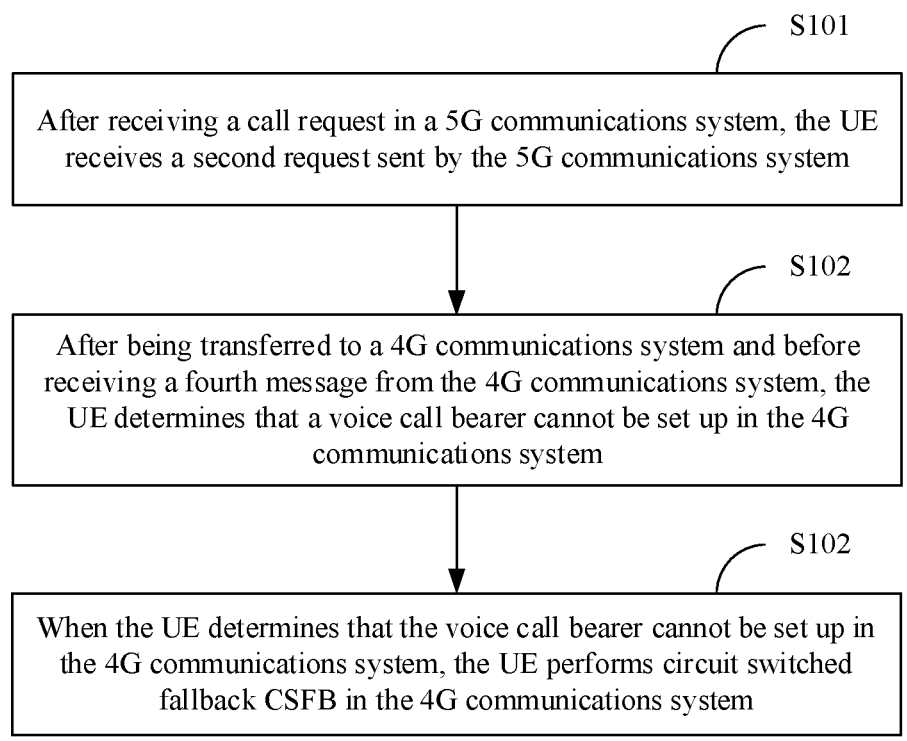
FIG. 8 is another example of a schematic flowchart of a circuit switched fallback method according to an embodiment of this application.

The following describes, with reference to FIG. 8, another circuit switched fallback method provided in the embodiments of this application by still using an example in which a first communications system is a 5G communications system and a second communications system is a 4G communications system. The method includes the following steps:

Step S201: After receiving a call request in the 5G communications system, UE 600 receives a second request sent by the 5G communications system. The second request indicates that the UE 600 is to be transferred to the 4G communications system.

Step S202: After being transferred to the 4G communications system and before receiving a fourth message from the 4G communications system, the UE 600 determines that a voice call bearer cannot be set up in the 4G communications system. The fourth message is used to indicate the UE 600 to initiate MT CSFB based on the fourth message. During implementation, the fourth message herein may be a circuit domain call request message sent by an MME to the UE 600, and is used by the UE to perform MT CSFB after receiving the fourth message, to perform a CS domain call.

Step S203: The UE 600 initiates CSFB in the 4G communications system when determining that the voice call bearer cannot be set up in the 4G communications system.

In this method, after the UE 600 in the 5G communications system receives the call request, if the UE 600 is transferred to the 4G communications system, the UE 600 can initiate CSFB in step S203 after determining in step S202 that the voice call bearer cannot be set up in the 4G communications system. In this method compared with the method for initiating CSFB shown in FIG. 3A to FIG. 3C, after performing step 308, the UE may initiate CSFB without waiting for the message that is sent by the MME in step 316 and that is used by the UE 600 to initiate MT CSFB. Therefore, call setup waiting duration of the UE 600 is shortened. In this method compared with the method for initiating CSFB shown in FIG. 4A to FIG. 4C, after performing step 409, the UE may initiate CSFB without waiting for the message that is sent by the MME in step 417 and that is used by the UE 600 to initiate MT CSFB. Therefore, call setup waiting duration of the UE 600 is shortened.

During specific implementation of step S101, the first request that is sent by the 5G communications system and that is received by the UE 600 may be a second message. The second message herein may be a message used by the UE 600 to determine that the UE 600 is to be handed over (handover) to the 4G communications system. Specifically, the second message may be a request message indicating that the UE 600 is to be handed over to the 4G communications system. In another implementation, the first request that is sent by the 5G communications system and that is received by the UE 600 may be alternatively a third message. The third message herein may be a message used by the UE 600 to determine that the UE 600 is to be redirected to the 4G communications system. Specifically, the third message may be a request message indicating that the UE 600 is to be redirected to the 4G communications system. During implementation, the request message indicating that the UE 600 is to be redirected to the 4G communications system may be a radio resource control (radio resource control, RRC) connection release (release) message sent to the UE 600.

During specific implementation of step S201, the second request that is sent by the 5G communications system and that is received by the UE 600 may be a second message or a third message. The second message may be a request message indicating that the UE 600 is to be handed over to the 4G communications system. The third message herein may be a message used by the UE 600 to determine that the UE 600 is to be redirected to the 4G communications system. For a specific implementation of the second request, refer to the implementation of the first request.

During specific implementation of step S102 and step S202, a plurality of manners may be used by the UE 600 to determine that the voice call bearer cannot be set up in the 4G communications system. The following uses several possible implementations as examples to describe a method for determining, by the UE 600, that the voice call bearer cannot be set up in the 4G communications system.

Manner 1: After determining that the 4G communications system does not support an IMS voice, the UE 600 may determine that the voice call bearer cannot be set up in the 4G communications system.

The UE 600 may determine, according to the following method, whether the 4G communications system supports an IP multimedia subsystem IMS voice:

In an implementation, after determining that the UE 600 is transferred to the 4G communications system, the UE 600 may initiate a circuit switched and packet switched combined location update in the 4G communications system, and determine, based on a received response message corresponding to the combined location update, whether the 4G communications system supports an IP multimedia subsystem IMS voice. Specifically, the UE 600 may send a circuit switched and packet switched combined location update request to a 4G core network element MME. After the UE 600 receives a response message corresponding to the combined location update request, if the UE 600 determines that the response message includes first information, the UE 600 determines that the 4G communications system does not support an IP multimedia subsystem IMS voice, to determine that the voice call bearer cannot be set up in the 4G communications system. Otherwise, the UE 600 determines that the 4G communications system supports an IP multimedia subsystem IMS voice. During implementation, the first information herein may be an indication that the 4G communications system does not support an IMS voice or an indication that an IMS voice cannot be set up in the 4G communications system.

In another implementation, after determining that the UE 600 is transferred to the 4G communications system, the UE 600 may initiate a circuit switched and packet switched combined registration in the 4G communications system, and determine, based on a received response message corresponding to the combined registration, whether the 4G communications system supports an IP multimedia subsystem IMS voice. Specifically, the UE 600 may send a circuit switched and packet switched combined registration request to a 4G core network element MME. After the UE 600 receives a response message corresponding to the combined location update request, if the UE 600 determines that the response message includes second information, the UE 600 determines that the 4G communications system does not support an IP multimedia subsystem IMS voice, to determine that the voice call bearer cannot be set up in the 4G communications system. Otherwise, the UE 600 determines that the 4G communications system supports an IP multimedia subsystem IMS voice. During implementation, the second information herein may be an indication that the 4G communications system does not support an IP multimedia subsystem IMS voice that is performed by using a PS session or an indication that an IMS voice cannot be set up in the 4G communications system.

It should be noted that, in the foregoing implementations, if the UE 600 determines that the 4G communications system supports an IP multimedia subsystem IMS voice, it does not necessarily mean that the UE 600 can definitely set up the voice call bearer in the 4G communications system.

Manner 2: The UE 600 may determine, based on a signal strength between the UE 600 and a base station in the 4G communications system, whether the voice call bearer can be set up in the 4G communications system.

In an implementation, the UE 600 determines whether a signal strength between the UE 600 and a base station in the 4G communications system is less than a threshold. The threshold herein may be a lowest signal strength for a voice bearer that can be set up by the UE in the 4G communications system. If the signal strength is less than the threshold, it indicates that the signal strength between the UE 600 and the base station in the 4G communications system is not strong enough after the UE 600 is transferred to the 4G communications system, and does not meet a requirement for a signal strength between the UE 600 and the base station in a process of setting up the voice call bearer in the 4G communications system. Therefore, the UE 600 may determine that the voice call bearer cannot be set up in the 4G communications system. Otherwise, if the UE 600 determines that the signal strength between the UE 600 and the base station in the 4G communications system is greater than or equal to the threshold, it indicates that after the UE 600 is transferred to the 4G communications system, the signal strength between the UE 600 and the base station in the 4G communications system meets a signal strength requirement for setting up the voice call bearer in the 4G communications system. In this case, the UE 600 may not perform CSFB. It should be noted that the UE 600 may alternatively determine whether a signal strength between the UE 600 and a base station in the 4G communications system is less than or equal to a threshold. If yes, the UE 600 determines that the voice call bearer cannot be set up in the 4G communications system.

In another implementation, the UE 600 may determine whether a signal strength that is not less than a threshold exists among signal strengths in all measurement reports previously sent to a base station in the 4G communications system. The threshold herein may be a lowest signal strength for a voice bearer that can be set up by the UE in the 4G communications system. If the UE 600 determines that no measurement report that is not less than the threshold is previously sent to the base station in the 4G communications system, it indicates that the signal strength between the UE 600 and the base station in the 4G communications system after the UE 600 is transferred to the 4G communications system does not meet a requirement for a signal strength between the UE 600 and the base station in a process of setting up the voice call bearer in the 4G communications system. In this case, the UE 600 determines that the voice call bearer cannot be set up in the 4G communications system. If the UE 600 determines that at least one signal strength that is greater than or equal to the threshold exists in the previously sent measurement reports, it indicates that the signal strength between the UE 600 and the base station at least once meets the requirement for a signal strength between the UE 600 and the base station in the process of setting up the voice call bearer in the 4G communications system. In this case, the UE 600 may not perform CSFB. It should be noted that the UE 600 may alternatively determine whether a signal strength greater than a threshold exists in measurement reports previously sent by the UE 600 to a base station in the 4G communications system. If the UE 600 determines that no measurement report greater than the threshold is previously sent to the base station in the 4G communications system, the UE 600 determines that the voice call bearer cannot be set up in the 4G communications system.

Manner 3: The UE 600 may determine, based on duration in which the UE 600 does not receive a radio resource control RRC connection reconfiguration message, that the voice call bearer cannot be set up in the 4G communications system.

After being transferred to the 4G communications system, the UE 600 may determine, based on the received RRC connection reconfiguration message sent by the base station, to set up the voice bearer in the 4G communications system. In this embodiment of this application, after the UE 600 does not receive the RRC connection reconfiguration message within preset duration, the UE 600 may determine that the voice call bearer cannot be set up in the 4G communications system. Therefore, the UE 600 may perform CSFB, so that the UE 600 does not need to wait for the RRC connection reconfiguration message for a long time. In addition, during implementation, after the UE 600 determines that the UE 600 can receive the RRC connection reconfiguration message within the preset duration, the UE 600 may be indicated not to perform CSFB.

In an implementation, after determining that duration in which the UE 600 receives a second message reaches first preset duration and that the UE 600 does not receive the RRC reconfiguration message, the UE 600 may determine that the voice call bearer cannot be set up in the 4G communications system. The second message herein may be a message indicating that the UE 600 is to be handed over to the 4G communications system. If the UE 600 determines that, when the UE 600 receives the RRC reconfiguration message, duration in which the UE 600 receives the second message does not reach the first preset duration, the UE 600 determines not to perform CSFB.

In another implementation, after determining that duration in which the UE 600 receives a third message reaches second preset duration and that the UE 600 does not receive an RRC reconfiguration message, the UE 600 may determine that the voice call bearer cannot be set up in the 4G communications system. The third message herein may be a message indicating that the UE 600 is to be redirected to the 4G communications system. If the UE 600 determines that, when the UE 600 receives the RRC reconfiguration message, duration in which the UE 600 receives the third message does not reach the second preset duration, the UE 600 determines not to perform CSFB.

In another implementation, after determining that duration in which the UE 600 receives a response message reaches third preset duration and that the UE 600 does not receive an RRC reconfiguration message, the UE 600 may determine that the voice call bearer cannot be set up in the 4G communications system. The response message herein may be a response message corresponding to a circuit switched and packet switched combined registration request initiated by the UE 600 in the 4G communications system. If the UE 600 determines that, when the UE 600 receives the RRC reconfiguration message, duration in which the UE 600 receives the response message does not reach the third preset duration, the UE 600 determines not to perform CSFB.

It should be noted that the first preset duration, the second preset duration, and the third preset duration herein may be determined based on statistical data of duration required by the UE to set up a voice bearer in the 4G communications system. For example, each of the first preset duration, the second preset duration, and the third preset duration is a statistical average value of duration required by the UE to set up a voice bearer in the 4G communications system. During implementation, the first preset duration, the second preset duration, and the third preset duration may be preset values on the UE 600.

During implementation, for the first preset duration, the second preset duration, and the third preset duration, time may be measured by using a counter. For example, after receiving the second message, the UE 600 may start a first counter to measure time for the first preset duration. When the first counter stops counting, if the UE 600 does not receive the RRC reconfiguration message, the UE 600 may determine that the voice call bearer cannot be set up in the 4G communications system by using the reconfiguration message. Alternatively, after receiving the third message, the UE 600 may start a second counter to measure time for the second preset duration. When the second counter stops counting, if the UE 600 does not receive the RRC reconfiguration message, the UE 600 may determine that the voice call bearer cannot be set up in the 4G communications system by using the reconfiguration message. Alternatively, the UE 600 may start a third counter after receiving the response message corresponding to the circuit switched and packet switched combined registration request, and measure time for the third preset duration. When the third counter stops counting, if the UE 600 does not receive the RRC reconfiguration message, the UE 600 may determine that the voice call bearer cannot be set up in the 4G communications system by using the reconfiguration message.

It should be noted that the foregoing manners in which the UE 600 determines that the voice call bearer cannot be set up in the 4G communications system are merely examples for description. In the circuit switched fallback method provided in the embodiments of this application, the UE 600 may determine, by using one of the foregoing manners or a combination of a plurality of the foregoing manners, whether the voice call bearer cannot be set up in the 4G communications system. For example, after determining, based on manner 1, that the 4G communications system supports an IP multimedia subsystem IMS voice, the UE 600 may determine, based on manner 2, that the voice call bearer cannot be set up in the 4G communications system. For another example, after the UE 600 receives the second message indicating that the UE 600 is to be handed over to the 4G communications system, if the UE 600 determines that the signal strength between the UE 600 and the base station in the 4G communications system is less than the threshold, the UE 600 may further determine, based on manner 3, whether the UE 600 cannot receive the RRC connection reconfiguration message within the first preset duration after receiving the second message. If yes, the UE 600 determines that the voice call bearer cannot be set up in the 4G communications system. Otherwise, if the UE 600 receives the RRC connection reconfiguration message within the first preset duration, even if the UE 600 determines that the signal strength between the UE 600 and the base station in the 4G communications system is less than the threshold, the UE 600 may still not perform CSFB.

During implementation of step S103 and step S203, the UE 600 may perform CSFB in the 4G communications system in a manner in which the UE 600 sends an extended service request (extend service request) message in a connected state to an MME in the 4G communications system. The extended service request message may be an extended service request message whose service type (service type) is mobile originated (mobile originated, MO). Therefore, based on MO CSFB initiated in step S103, the calling UE 600 sets up a CS domain call.

After step S203, the UE 600 may further initiate a location area update (location area update, LAU) in the circuit switched domain. Specifically, the called UE 600 may send an LAU request to an MSC. The LAU request may carry a circuit switched fallback mobile terminated call (circuit switched fallback mobile terminated call, CSMT) indication or a follow on (follow on) indication, and is used to set up a mobility management (mobile management, MM) connection. After the MM connection is set up, the UE 600 may wait for a call setup (set up) request message from the network. In addition, after the UE 600 performs MO CSFB in the 4G communications system, the UE 600 may not actively initiate an LAU process, but wait for network paging (paging) in the circuit switched domain to wait for being called.

Figure 9A:
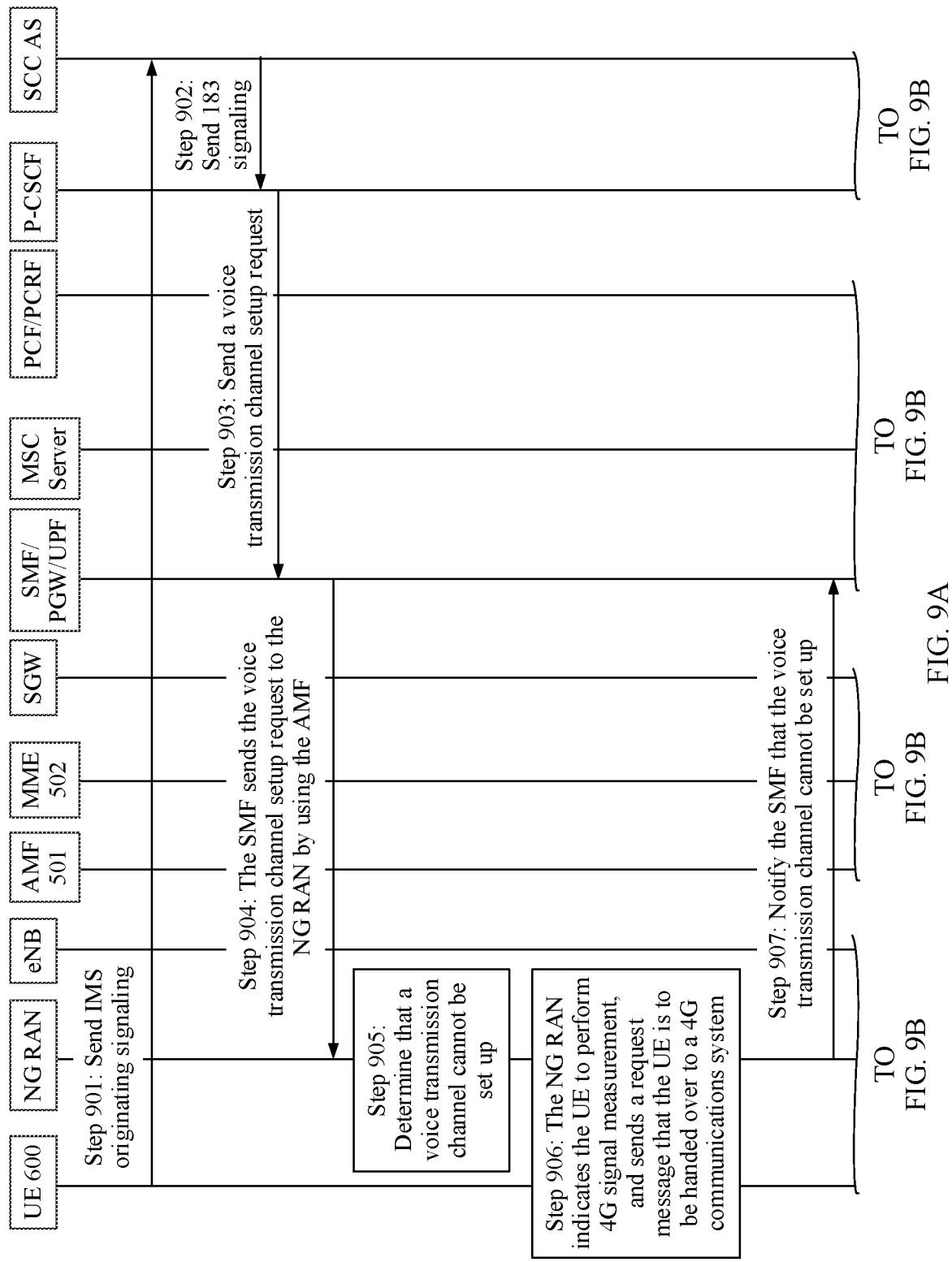

The 5G communications system shown in FIG. 5 is still used as an example. As shown in FIG. 9A and FIG. 9B, if UE 600 in the 5G communications system is transferred to 4G after sending a call request, a process in which the UE 600 performs CSFB according to the embodiments of this application may include the following steps:

Step 901: The UE 600 in the 5G communications system initiates IMS originating signaling. The IMS originating signaling is sent to an SCC AS. The IMS originating signaling may carry information such as information about a voice coding scheme supported by the UE 600, IP address information of the UE 600, and a port number of the UE 600.

Step 902: A P-CSCF receives a 183 message sent by a call peer device by using an IMS server. The IMS server herein may be an SCC AS. The 183 message is a response message sent by the called end device after the called end device receives the call request.

Step 903: The P-CSCF sends a voice transmission channel setup request to an SMF in the 5G communications system by using a PCF/PCRF.

Step 904: The SMF sends the voice transmission channel setup request to an NG RAN by using an AMF 501. The NG RAN is referred to as a 5G base station.

Step 905: The NG RAN determines that a voice transmission channel cannot be set up.

Step 906: The NG RAN indicates the UE 600 to perform 4G signal measurement, and sends, to the UE 600, a request message that the UE 600 is to be handed over to the 4G communications system.

Step 907: The NG RAN notifies, by using the AMF 501, the SMF that the voice transmission channel cannot be set up. The NG RAN may send an N2 message to the AMF 501, to indicate that setup of a QoS data flow is rejected due to IMS voice fallback. The AMF 501 may send, to the SMF, an SM request that carries a PDU modification command acknowledgment character.

Step 908: After being handed over to the 4G communications system, the UE 600 sends a circuit switched and packet switched combined location update request, and receives a response message corresponding to the combined location update request.

Step 909: The UE 600 determines whether the response message does not carry first information; and if yes, performs step 910; otherwise, performs step 911. The first information is used by the UE 600 to determine that an IMS voice service cannot be performed by using the 4G communications system. During implementation, the first information may be an indication that the 4G communications system does not support an IMS voice.

Step 910: The UE 600 determines whether a signal strength between the UE 600 and an eNB is not less than a threshold; and if yes, ends this procedure; otherwise, performs step 911. The eNB is a base station connected to the UE 600 in the 4G communications system. If the UE 600 determines that the signal strength between the UE 600 and the eNB is not less than the threshold, the UE 600 may continue to wait to set up the voice bearer in the 4G communications system after ending this procedure.

Step 911: The UE 600 performs mobile originated CSFB in the 4G communications system, and then ends this procedure. During implementation, the UE 600 may send an extended service request message whose service type is MO to an MME 502, to initiate MO CSFB.

In the foregoing method compared with the procedure of initiating CSFB shown in FIG. 1A and FIG. 1B, after step 108, the UE 600 may determine, by itself by using only step 909 and step 910, whether CSFB needs to be initiated. If a determining result is that CSFB needs to be initiated, the UE 600 may initiate CSFB for an originating process by using step 911. Therefore, the UE 600 no longer needs to wait for the network side to perform step 109 to step 113, and no longer needs to receive, by using step 113, the 500 reject message sent by the P-CSCF, thereby accelerating initiation of CSFB and reducing call setup duration.

As shown in FIG. 10A and FIG. 10B, if UE 600 in a 5G communications system is transferred to 4G after sending a call request, another process in which the UE 600 performs CSFB according to the embodiments of this application may include the following steps:

Step 1001: The UE 600 in the 5G communications system initiates IMS originating signaling. The IMS originating signaling is sent to an SCC AS. The IMS originating signaling may carry information such as information about a voice coding scheme supported by the UE 600, IP address information of the UE 600, and a port number of the UE 600.

Step 1002: A P-CSCF receives a 183 message that is sent by using an IMS server by a call peer device. The IMS server herein may be an SCC AS.

Step 1003: The P-CSCF sends a voice transmission channel setup request to an SMF in the 5G communications system by using a PCF/PCRF.

Step 1004: The SMF sends the voice transmission channel setup request to an NG RAN by using an AMF 501. The NG RAN is referred to as a 5G base station.

Step 1005: The NG RAN determines that a voice transmission channel cannot be set up.

Step 1006: The NG RAN indicates the UE 600 to perform 4G signal measurement, and sends, to the UE 600, a request message that the UE 600 is to be handed over to the 4G communications system.

Step 1007: The NG RAN notifies, by using the AMF 501, the SMF that the voice transmission channel cannot be set up. The NG RAN may send an N2 message to the AMF 501, to indicate that setup of a QoS data flow is rejected due to IMS voice fallback. The AMF 501 may send, to the SMF, an SM request that carries a PDU modification command acknowledgment character.

Step 1008: The NG RAN sends an RRC connection release message to the UE 600, to redirect the UE 600 to the 4G communications system.

Step 1009: After the UE 600 is redirected to the 4G communications system based on the RRC connection release message, the UE 600 sends a circuit switched and packet switched combined registration request, and receives a response message corresponding to the combined registration request.

Step 1010: The UE 600 determines whether the response message does not carry second information; and if yes, performs step 1011; otherwise, performs step 1012. The second information is used by the UE 600 to determine that an IMS voice service cannot be performed by using the 4G communications system. During implementation, the second information may be an indication that the 4G communications system does not support an IMS voice.

Step 1011: The UE 600 determines whether a signal strength between the UE 600 and an eNB is not less than a threshold; and if yes, ends this procedure; otherwise, performs step 1012. The eNB is a base station connected to the UE 600 in the 4G communications system. If the UE 600 determines that the signal strength between the UE 600 and the eNB is not less than the threshold, the UE 600 may continue to wait to set up the voice bearer in the 4G communications system after ending this procedure.

Step 1012: The UE 600 performs originated CSFB in the 4G communications system, and then ends this procedure. During implementation, the UE 600 may send an extended service request message whose service type is MO to an MME 1002, to initiate CSFB.

In the foregoing method compared with the procedure of initiating CSFB shown in FIG. 2A to FIG. 2C, after step 209, the UE 600 may determine, by itself by using only step 1010 and step 1011, whether CSFB needs to be initiated. If a determining result is that CSFB needs to be initiated, the UE 600 may initiate CSFB for an originating process by using step 1012. Therefore, the UE 600 no longer needs to wait for the network side to perform step 210 to step 214, and no longer needs to receive, by using step 214, the 500 reject message sent by the P-CSCF, thereby accelerating initiation of CSFB and reducing call setup duration.

Figure 11B:
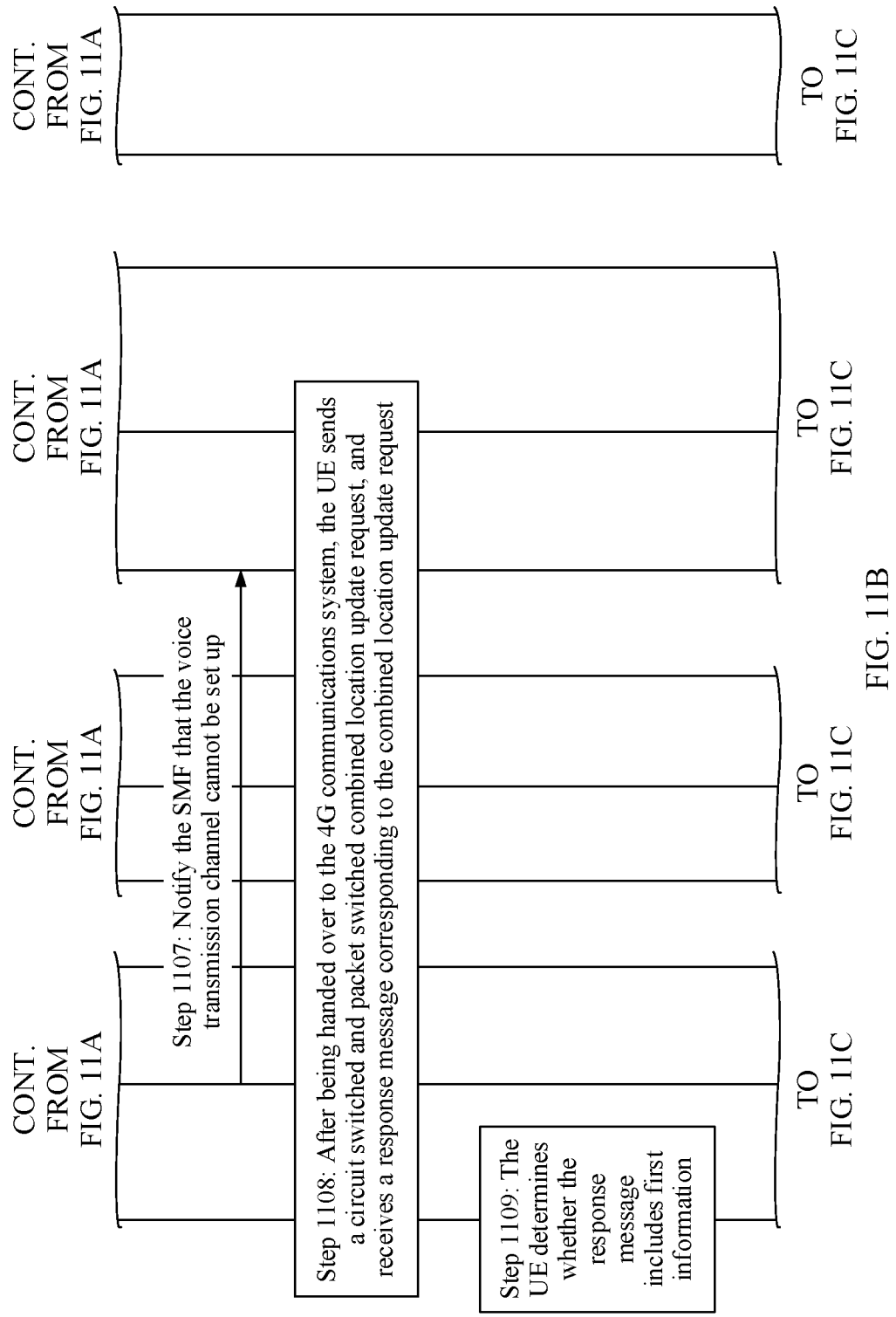

As shown in FIG. 11A to FIG. 11C, if UE 600 in a 5G communications system is transferred to 4G after receiving a call request, a process in which the UE 600 performs CSFB according to the embodiments of this application may include the following steps:

Step 1101: The UE 600 in the 5G communications system receives IMS terminating signaling. The IMS terminating signaling is sent by an SCC AS. The IMS terminating signaling may carry information such as information about of a voice coding scheme supported by a call peer device, IP address information of the call peer device, and a port number of the call peer device.

Step 1102: The UE 600 sends a 183 message to a P-CSCF. The 183 message may carry information about a coding scheme selected by the UE 600, and the like.

Step 1103: The P-CSCF sends a voice transmission channel setup request to an SMF in the 5G communications system by using a PCF/PCRF.

Step 1104: The SMF sends the voice transmission channel setup request to an NG RAN by using an AMF 501. The NG RAN is referred to as a 5G base station.

Step 1105: The NG RAN determines that a voice transmission channel cannot be set up.

Step 1106: The NG RAN indicates the UE 600 to perform 4G signal measurement, and sends, to the UE 600, a request message that the UE 600 is to be handed over to the 4G communications system.

Step 1107: The NG RAN notifies, by using the AMF 501, the SMF that the voice transmission channel cannot be set up. The NG RAN may send an N2 message to the AMF 501, to indicate that setup of a QoS data flow is rejected due to IMS voice fallback. The AMF 501 may send, to the SMF, an SM request that carries a PDU modification command acknowledgment character.

Step 1108: After being handed over to the 4G communications system, the UE 600 sends a circuit switched and packet switched combined location update request, and receives a response message corresponding to the combined location update request.

Step 1109: The UE 600 determines whether the response message does not carry first information; and if yes, performs step 1110; otherwise, performs step 1111. The first information is used by the UE 600 to determine that an IMS voice service cannot be performed by using the 4G communications system. During implementation, the first information may be an indication that the 4G communications system does not support an IMS voice.

Step 1110: The UE 600 determines whether a signal strength between the UE 600 and an eNB is not less than a threshold; and if yes, ends this procedure; otherwise, performs step 1111. The eNB is a base station connected to the UE 600 in the 4G communications system. If the UE 600 determines that the signal strength between the UE 600 and the eNB is not less than the threshold, the UE 600 may continue to wait to set up the voice bearer in the 4G communications system after ending this procedure.

Step 1111: The UE 600 performs mobile originated CSFB in the 4G communications system. During implementation, the UE 600 may send an extended service request message whose service type is MO to an MME 502, to initiate and implement CSFB.

Step 1112: After falling back to the CS domain, the UE 600 sends an LAU request in the CS domain to set up an MM connection. The LAU request may carry a CSMT indication or a follow on indication.

Step 1113: After the MM connection is set up, the UE 600 receives a call setup set up request message, to set up a call according to the prior art.

In the foregoing method compared with the procedure of initiating CSFB shown in FIG. 3A to FIG. 3C, after step 308, the UE 600 may determine, by itself by using only step 1109 and step 1110, whether CSFB needs to be initiated. If a determining result is that CSFB needs to be initiated, the UE 600 may initiate CSFB for an originating process by using step 1111. Therefore, the UE 600 may initiate CSFB without waiting for the network side to perform step 309 to step 316, and without receiving, by using step 316, the message that is sent by the MME and that is used by the UE 600 to determine to initiate MT CSFB, thereby accelerating initiation of CSFB and reducing call setup duration.

As shown in FIG. 12A to FIG. 12C, if UE 600 in a 5G communications system is transferred to 4G after receiving a call request, another process in which the UE 600 performs CSFB according to the embodiments of this application may include the following steps:

Step 1201: The UE 600 in the 5G communications system receives IMS terminating signaling. The IMS terminating signaling is sent by an SCC AS. The IMS terminating signaling may carry information such as information about of a voice coding scheme supported by a call peer device, IP address information of the call peer device, and a port number of the call peer device.

Step 1202: The UE 600 sends a 183 message to a P-CSCF. The 183 message may carry information about a coding scheme selected by the UE 600, and the like.

Step 1203: The P-CSCF sends a voice transmission channel setup request to an SMF in the 5G communications system by using a PCF/PCRF.

Step 1204: The SMF sends the voice transmission channel setup request to an NG RAN by using an AMF 501. The NG RAN is referred to as a 5G base station.

Step 1205: The NG RAN determines that a voice transmission channel cannot be set up.

Step 1206: The NG RAN indicates the UE 600 to perform 4G signal measurement, and sends, to the UE 600, a request message that the UE 600 is to be handed over to the 4G communications system.

Step 1207: The NG RAN notifies, by using the AMF 501, the SMF that the voice transmission channel cannot be set up. The NG RAN may send an N2 message to the AMF 501, to indicate that setup of a QoS data flow is rejected due to IMS voice fallback. The AMF 501 may send, to the SMF, an SM request that carries a PDU modification command acknowledgment character.

Step 1208: The NG RAN sends an RRC connection release message to the UE 600, to redirect the UE 600 to the 4G communications system.

Step 1209: After the UE 600 is redirected to the 4G communications system based on the RRC connection release message, the UE 600 sends a circuit switched and packet switched combined registration request, and receives a response message corresponding to the combined registration request.

Step 1210: The UE 600 determines whether the response message does not carry second information; and if yes, performs step 1211; otherwise, performs step 1212. The second information is used by the UE 600 to determine that an IMS voice service cannot be performed by using the 4G communications system. During implementation, the second information may be an indication that the 4G communications system does not support an IMS voice.

Step 1211: The UE 600 determines whether a signal strength between the UE 600 and an eNB is not less than a threshold; and if yes, ends this procedure; otherwise, performs step 1212. The eNB is a base station connected to the UE 600 in the 4G communications system. If the UE 600 determines that the signal strength between the UE 600 and the eNB is not less than the threshold, the UE 600 may continue to wait to set up the voice bearer in the 4G communications system after ending this procedure.

Step 1212: The UE 600 performs CSFB in the 4G communications system. During implementation, the UE 600 may send an extended service request message whose service type is MO to an MME 502, to initiate CSFB.

Step 1213: After falling back to the CS domain, the UE 600 sends an LAU request in the CS domain to set up an MM connection. The LAU request may carry a CSMT indication or a follow on indication.

Step 1214: After the MM connection is set up, the UE 600 receives a call setup set up request message, to set up a call according to the prior art.

In the foregoing method compared with the procedure of initiating CSFB shown in FIG. 4A to FIG. 4C, after step 409, the UE 600 may determine, by itself by using only step 1210 and step 1211, whether CSFB needs to be initiated. If a determining result is that CSFB needs to be initiated, the UE 600 may initiate CSFB for an originating process by using step 1212. Therefore, the UE 600 may initiate CSFB without waiting for the network side to perform step 410 to step 417, and without receiving, by using step 417, the message that is sent by the MME and that is used by the UE 600 to determine to initiate MT CSFB, thereby accelerating initiation of CSFB and reducing call setup duration.

Based on the same inventive concept, the embodiments of this application further provides a call setup method. The method includes:

determining, by the UE in a process of initiating or receiving a call in a first communications system, that the UE is to be transferred to a second communications system;

determining, by the UE, that a voice call bearer cannot be set up in the second communications system; and initiating, by the UE, a CSFB request in the second communications system, and making a voice call in the CS domain.

Therefore, on its own, the UE may determine in advance that the voice bearer cannot be set up in the second communications system, without waiting for an indication message from the network side, and may further perform CSFB to fall back to the CS domain in advance and make a voice call, thereby shortening a call setup delay.

In a possible design, the first communications system may be a 5G communications system, and the second communications system may be a 4G communications system. The determining, by the UE, that the UE is to be transferred to a second communications system includes:

receiving, by the UE, a request message that the UE is to be handed over to the 4G communications system; or receiving, by the UE, a request message that the UE is to be redirected to the 4G communications system.

Therefore, the UE may determine, by receiving the handover message or the redirection message, that the UE is to be transferred to the second communications system.

In a possible design, the determining, by the UE, that a voice call bearer cannot be set up in the second communications system includes:

initiating, by the UE, a circuit switched and packet switched combined location update request in the second communications system, receiving, by the UE, a response message corresponding to the location update request, and determining that the response message carries an indication that the second communications system does not support an IP multimedia subsystem IMS voice; or initiating, by the UE, a circuit switched and packet switched combined registration request in the second communications system, receiving, by the UE, a response message corresponding to the registration request, and determining that the response message carries an indication that the second communications system does not support an IP multimedia subsystem IMS voice.

Therefore, the UE may determine, by receiving the response message corresponding to the circuit switched and packet switched combined location update request, or by receiving the response message corresponding to the circuit switched and packet switched combined registration request, that the voice bearer cannot be set up in the second communications system.

In a possible design, the determining, by the UE, that a voice call bearer cannot be set up in the second communications system includes:

determining, by UE, that a signal strength between the UE and a base station in the second communications system is less than a threshold; or determining, by the UE, that the UE does not send, to a base station eNB in the second communications system, a measurement report greater than a threshold.

The UE may determine, by comparing the signal strength with the threshold, that the voice bearer cannot be set up in the second communications system In a possible design, the determining, by the UE, that a voice call bearer cannot be set up in the second communications system includes:

receiving, by the UE, a request message that the UE is to be handed over handover to the 4G communications system, starting a timer, and when the timer expires, determining, by the UE, that the UE does not receive a radio resource control RRC connection reconfiguration message; or receiving, by the UE, a request message that the UE is to be redirected to the 4G communications system, starting a timer, and when the timer expires, determining, by the UE, that the UE does not receive a radio resource control RRC connection reconfiguration message.

The UE starts the timer, and if the UE does not receive the RRC connection reconfiguration message before the timer expires, the UE determines that the voice call bearer cannot be set up in the second communications system, and then performs CSFB. This can prevent the UE from making a wrong decision, and ensure reliability of independent initiation of CSFB by the UE.

During implementation, the timer is preconfigured on the UE, or is dynamically configured by the UE based on statistical data of duration required for setting up a voice bearer.

In a possible design, the initiating, by UE, a circuit switched CS fallback request in a second communications system includes:

initiating, by the UE, in the second communications system, an extended service request message whose service type service type is mobile originated MO.

By setting the service type, the UE can ensure that a core network device correctly processes the request of the UE.

In a possible design, after the performing, by the UE, CSFB, the method further includes:

initiating, by the UE, an LAU in the CS domain; or waiting, by the UE, for a network paging message in the CS domain.

The call setup delay can be shortened by enabling the UE to enter the CS domain in advance.

In a possible design, the initiating, by UE, an LAU in the CS domain includes:

sending, by the UE, an LAU request, where the LAU request carries a follow on indication, and/or the LAU request carries a CSMT indication.

The UE uses the LAU request to carry the follow on indication and/or CSMT indication, to ensure that the core network device remains connected to the UE, thereby accelerating the call setup process.

Based on a same inventive concept, an embodiment of this application further provides UE. The UE may have a structure shown in FIG. 6, and have a behavior function of the UE 600 in the foregoing method embodiments.

Figure 6:
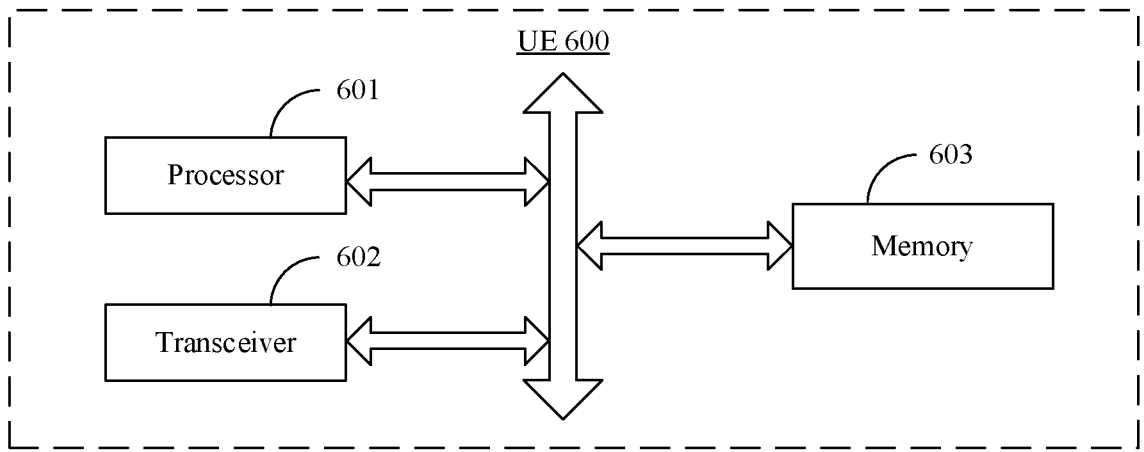
FIG. 6 is an example of a schematic structural diagram of user equipment UE according to an embodiment of this application.

Based on the circuit switched fallback method shown in FIG. 7, the processor 601 in the UE 600 shown in FIG. 6 may be configured to perform step S102, and the transceiver 602 may be configured to perform steps S101 and S103.

Based on the circuit switched fallback method shown in FIG. 8, the processor 601 in the UE 600 shown in FIG. 6 may be configured to perform step S202, and the transceiver 602 may be configured to perform steps S201 and S203.

In a possible design, based on the circuit switched fallback method shown in FIG. 7, a first request may be a second message or a third message. The second message is used by the UE to determine that the UE is to be handed over handover to the second communications system. The third message is used by the UE to determine that the UE is to be redirected to the second communications system.

In a possible design, based on the circuit switched fallback method shown in FIG. 8, a second request may be a second message or a third message. The second message is used by the UE to determine that the UE is to be handed over handover to the second communications system. The third message is used by the UE to determine that the UE is to be redirected to the second communications system.

In a possible design, the processor 601 may be configured to: after determining that at least one of the following is met, determine that a voice call bearer cannot be set up in the second communications system:

a response message that is received by the UE 600 and that is corresponding to a combined location update request carries first information, where the combined location update request is a circuit switched and packet switched combined location update request sent by the UE 600 in the second communications system, and the first information is used by the UE 600 to determine that an IMS voice service cannot be performed by using the second communications system; or a response message that is received by the UE 600 and that is corresponding to a combined registration request carries second information, where the combined registration request is a circuit switched and packet switched combined registration request sent by the UE 600 in the second communications system, and the second information is used by the UE 600 to determine that an IMS voice service cannot be performed by using the second communications system; or a signal strength between the UE 600 and a base station in the second communications system is less than a threshold; or the UE 600 does not send a measurement report greater than a threshold to a base station in the second communications system; or the UE 600 does not send a measurement report that is not less than a threshold to a base station in the second communications system; or duration in which the UE 600 receives a second message reaches first preset duration, and the UE 600 does not receive a radio resource control RRC connection reconfiguration message, where the second message indicates that the UE 600 is to be handed over handover to the second communications system; or duration in which the UE 600 receives a third message reaches second preset duration, and the UE 600 does not receive an RRC connection reconfiguration message, where the third message indicates that the UE 600 is to be redirected to the second communications system; or duration in which the UE 600 receives a response message corresponding to a combined registration request reaches third preset duration, and the UE 600 does not receive an RRC connection reconfiguration message, where the combined registration request is a circuit switched and packet switched combined registration request sent by the UE 600 in the second communications system.

The RRC connection reconfiguration message is used by the UE 600 to determine to set up the voice call bearer in the second communications system.

In a possible design, the transceiver 602 is specifically configured to:

send an extended service request message in the second communications system, where a service type service type of the extended service request message is mobile originated MO.

In a possible design, the transceiver 602 is further configured to:

initiate an LAU in a circuit switched domain; or receive a network paging message in a CS domain.

In a possible design, the transceiver 602 is specifically configured to:

send an LAU request, where the LAU request may carry a follow on indication and/or the LAU request may carry a CSMT indication.

Figure 13:
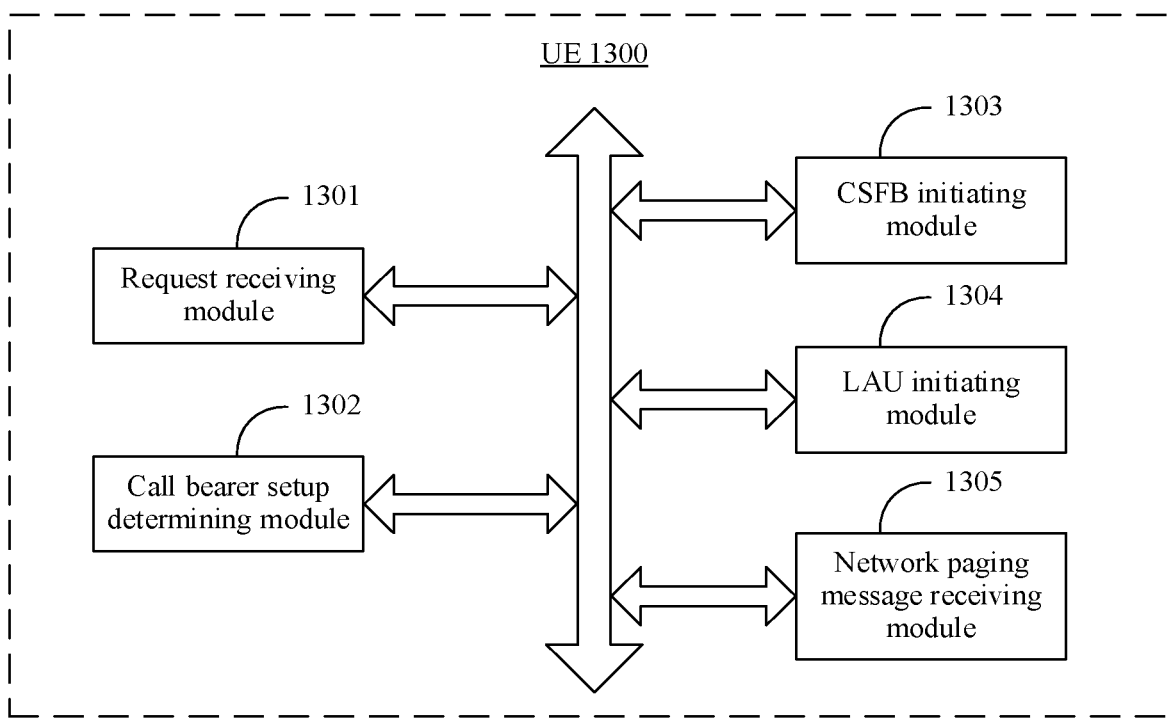
FIG. 13 is another example of a schematic structural diagram of user equipment UE according to an embodiment of this application.

As shown in FIG. 13, in another possible structure of the UE provided in this embodiment of this application, the UE uses a modular design. For example, UE 1300 that uses a modular design may include a request receiving module 1301, a call bearer setup determining module 1302, and a CSFB initiating module 1303.

The request receiving module 1301 is configured to: after the UE sends a call request in a first communications system, receive a first request sent by the first communications system, where the first request indicates that the UE 1300 is to be transferred to a second communications system. The call bearer setup determining module 1302 is configured to: after the UE 1300 is transferred to the second communications system and before the UE 1300 receives a first message from the second communications system, determine that a voice call bearer cannot be set up in the second communications system, where the first message is used by the UE 1300 to determine that the call request fails. The CSFB initiating module 1303 is configured to: when it is determined that the voice call bearer cannot be set up in the second communications system, initiate CSFB in the second communications system. The first communications system is a 5G communications system, and the second communications system is a 4G communications system.

For example, the request receiving module 1301 may be further configured to: after the UE receives a call request in a first communications system, receive a second request sent by the first communications system, where the first request indicates that the UE 1300 is to be transferred to a second communications system. The call bearer setup determining module 1302 may be further configured to: before the UE 1300 receives a fourth message, determine that a voice call bearer cannot be set up in the second communications system, where the fourth message is used by the UE 1300 to initiate MT CSFB based on the fourth message. The CSFB initiating module 1303 is configured to: when it is determined that the voice call bearer cannot be set up in the second communications system, initiate CSFB in the second communications system. The first communications system is a 5G communications system, and the second communications system is a 4G communications system.

In a possible design, the first request may be a second message or a third message. The second message is used by the UE to determine that the UE is to be handed over handover to the second communications system. The third message is used by the UE to determine that the UE is to be redirected to the second communications system. The second request may be a second message or a third message. The second message is used by the UE to determine that the UE is to be handed over handover to the second communications system. The third message is used by the UE to determine that the UE is to be redirected to the second communications system.

In a possible design, after determining that at least one of the following is met, the call bearer establishment determining module 1302 may determine that the voice call bearer cannot be established in the second communications system:

it is determined that a response message that is received by the UE 1300 and that is corresponding to a combined location update request carries first information, where the combined location update request is a circuit switched and packet switched combined location update request sent by the UE 1300 in the second communications system, and the first information is used by the UE 1300 to determine that an IP multimedia subsystem IMS voice service cannot be performed by using the second communications system; or it is determined that a response message that is received by the UE and that is corresponding to a combined registration request carries second information, where the combined registration request is a circuit switched and packet switched combined registration request sent by the UE in the second communications system, and the second information is used by the UE to determine that an IP multimedia subsystem IMS voice service cannot be performed by using the second communications system; or it is determined that a signal strength between the UE and a base station in the second communications system is less than a threshold; or it is determined that the UE does not send a measurement report greater than a threshold to a base station in the second communications system; or it is determined that the UE does not send a measurement report that is not less than a threshold to a base station in the second communications system; or it is determined that duration in which the UE receives a second message reaches first preset duration, and that the UE does not receive a radio resource control RRC connection reconfiguration message, where the second message is used by the UE to determine that the UE is to be handed over handover to the second communications system; or it is determined that duration in which the UE receives a third message reaches second preset duration, and that the UE does not receive an RRC connection reconfiguration message, where the third message is used by the UE to determine that the UE is to be redirected to the 4G communications system; or it is determined that duration in which the UE receives a response message corresponding to a combined registration request reaches third preset duration, and that the UE does not receive an RRC connection reconfiguration message, where the combined registration request is a circuit switched and packet switched combined registration request sent by the UE in the second communications system.

The RRC connection reconfiguration message is used by the UE to determine to set up the voice call bearer in the second communications system.

In a possible design, when initiating CSFB, the CSFB initiating module 1303 may be configured to send an extended service request message in the second communications system, where a service type service type of the extended service request message is mobile originated MO.

In a possible design, the UE 1300 may further include an LAU initiating module 1304, configured to initiate a location area update LAU in a circuit switched domain; or the UE 1300 may further include a network paging message receiving module 1305, configured to receive a network paging message in a circuit switched domain.

In a possible design, when initiating the LAU, the LAU initiating module 1304 may be configured to send an LAU request, where the LAU request may carry a follow on indication and/or a CSMT indication.

Figure 14:
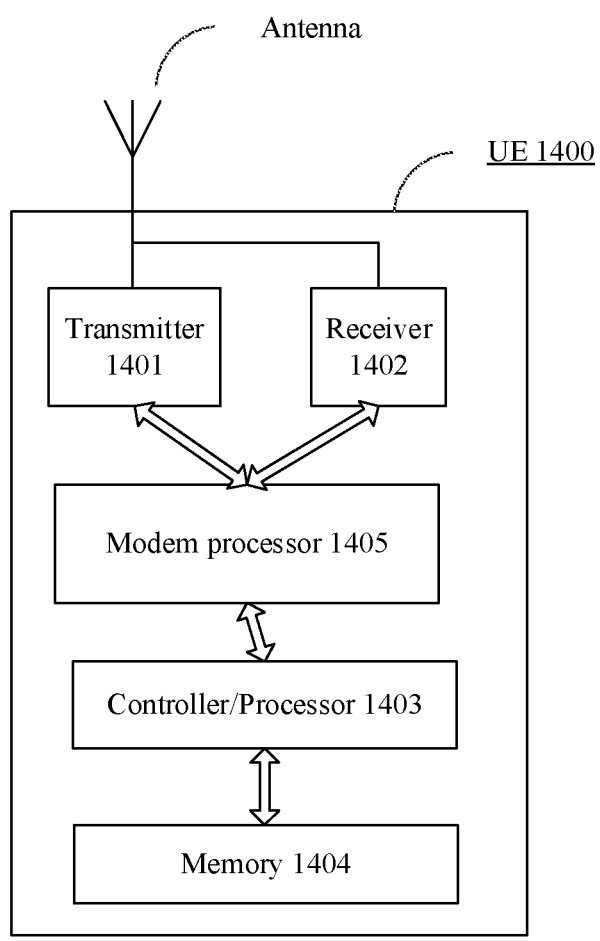
FIG. 14 is still another example of a schematic structural diagram of user equipment UE according to an embodiment of this application.

FIG. 14 is a simplified schematic diagram of another possible design structure of UE in the foregoing embodiments. UE 1400 includes a transmitter 1401, a receiver 1402, a controller/processor 1403, a memory 1404, and a modem processor 1405.

For example, the transmitter 1401 may adjust (for example, perform analog conversion, filtering, amplification, and up-conversion on) an output sample to generate a transmit signal when the UE 1400 sends a message, and the transmit signal is transmitted by an antenna on an uplink. On a downlink, an antenna receives a downlink signal, and the receiver 1402 adjusts (for example, performs filtering, amplification, down-conversion, and digitization on) the downlink signal received from the antenna and provides an input sample. An encoder receives service data and a signaling message that need to be sent on an uplink, and processes (for example, formats, encodes, and interleaves) the service data and the signaling message, for example, an extended service request message, an LAU request, or the like whose service type is mobile originated in this embodiment of this application. A modulator further processes (for example, performs symbol mapping and modulation on) the encoded service data and signaling message and provides an output sample. A demodulator processes (for example, demodulates) the input sample and provides symbol estimation. A decoder processes (for example, performs de-interleaving and decoding on) the symbol estimation and provides decoded data and a decoded signaling message that are to be sent to the UE 1400. The encoder, the modulator, the demodulator, and the decoder may be implemented by the modem processor 1405. These units perform processing based on a radio access technology (for example, an access technology in LTE and another evolved system) used in a radio access network.

The controller/processor 1403 controls and manages an action of the UE 1400, and is configured to execute processing performed by the UE in the foregoing embodiments, for example, configured to determine that the UE 1400 is transferred to the second communications system and/or perform other processes in the circuit switched fallback method described in the present invention.

In an example, the controller/processor 1403 may be configured to support the UE 1400 in implementing a function that can be implemented by the processor 601 shown in FIG. 6. The memory 1404 stores program code and data that are used by the controller/processor 1403 to implement a corresponding function. The transmitter 1401 may be configured to support the UE 1400 in implementing a sending function that can be implemented by the transceiver 602 shown in FIG. 6. The receiver 1402 may be configured to support the UE 1400 in implementing a receiving function that can be implemented by the transceiver 602 shown in FIG. 6.

Based on a same concept as the foregoing method embodiments, an embodiment of this application further provides a computer readable storage medium. The computer readable storage medium stores some instructions. When these instructions are invoked and executed, a computer is enabled to perform a function of the UE in any one of the foregoing method embodiments or the possible designs of the foregoing method embodiments. The computer readable storage medium is not limited in the embodiments of this application. For example, the computer readable storage medium may be a RAM (random access memory, random access memory) or a ROM (read-only memory, read-only memory).

Based on a same concept as the foregoing method embodiments, an embodiment of this application further provides a computer program product. When the computer program product is run on a computer, the computer is enabled to perform a function of the UE in any one of the foregoing method embodiments or the possible designs of the foregoing method embodiments.

Based on a same concept as the foregoing method embodiments, an embodiment of this application further provides a chip. The chip may be coupled to a transceiver, and is configured to implement a function of the UE in any one of the foregoing method embodiments or the possible designs of the foregoing method embodiments. The chip may be a chip located in the UE provided in the embodiments of this application.

Based on a same concept as the foregoing method embodiments, an embodiment of this application further provides an apparatus. The apparatus includes a processing module and a communications interface. The processing module is configured to perform the steps performed by the UE in any one of the foregoing method embodiments or the possible designs of the method embodiments. The communications interface is used by the apparatus for communication. For example, the communications interface may have a function of a transceiver in any one of the foregoing method embodiments or the possible designs of the foregoing method embodiments.

In a possible design, the apparatus further includes a storage module, configured to store a program instruction and data that are necessary for the processing module.

In a possible design, the apparatus is a chip or a chip system.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In this application, "at least one" means one or more, and "a plurality of" means two or more. "At least one (one piece) of the following" or a similar expression thereof refers to any combination of these items, including any combination of singular items (pieces) or plural items (pieces). For example, "at least one of a, b, or c" or "at least one of a, b, and c" may indicate: a, b, c, a-b (that is, a and b), a-c, b-c, or a-b-c, where a, b, and c may be in a singular or plural form.

It should be understood that sequence numbers of the foregoing processes do not mean execution sequences in various embodiments of this application. Some or all steps may be performed concurrently or in sequence. The execution sequences of the processes should be determined based on functions and internal logic of the processes, and should not be construed as any limitation on the implementation processes of the embodiments of this application.

For related parts between the method embodiments of this application, refer to each other. The apparatus provided in each apparatus embodiment is configured to perform the method provided in the corresponding method embodiment. Therefore, each apparatus embodiment may be understood with reference to a related part in a related method embodiment.

Structural diagrams of the apparatuses provided in the apparatus embodiments of this application merely show simplified designs of the corresponding apparatuses. In actual application, the apparatus may include any quantity of transmitters, receivers, processors, memories, and the like, to implement functions or operations performed by the apparatuses in the apparatus embodiments of this application.

Although some possible embodiments of this application have been described, a person skilled in the art can make changes and modifications to these embodiments once the person learns the basic inventive concept. Therefore, the following claims are intended to be construed as to cover the embodiments of this application and all changes and modifications falling within the scope of this application.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A circuit switched fallback (CSFB) method implemented by a user equipment (UE), wherein the CSFB method comprises:
sending a call request in a first communications system, wherein the first communications system is a fifth generation (5G) communications system;

receiving, from the first communications system, a first request indicating that the UE is to be transferred to a second communications system, wherein the second communications system is a fourth generation (4G) communications system;

determining that a voice call bearer cannot be set up in the second communications system after the UE is transferred to the second communications system;

initiating a CSFB in the second communications system when the voice call bearer cannot be set up in the second communications system;

receiving, after being transferred to the second communications system, a first message from the second communications system;

determining, based on the first message, that the call request has failed;

and wherein the determining that a voice call bearer cannot be setup in the second communication system is performed before receiving the first message from the second communications system.

2. The CSFB method of claim 1, further comprising:

determining, based on a second message, that the UE is to be handed over to the second communications system when the first request is the second message; and determining, based on a third message, that the UE is to be redirected to the second communications system when the first request is the third message.

3. The CSFB method of claim 1, further comprising:

sending a circuit switched and packet switched combined location update request in the second communications system, receiving a first response message that corresponds to the circuit switched and packet switched combined location update request and that carries first information, and determining, based on the first information, that an Internet Protocol (IP) Multimedia Subsystem (IMS) voice service cannot be performed using the second communications system;

sending a circuit switched and packet switched combined registration request in the second communications system, receiving a second response message that corresponds to the circuit switched and packet switched combined registration request and that carries second information, and determining, based on the second information, that the IMS voice service cannot be performed using the second communications system;

determining that a signal strength between the UE and a base station in the second communications system is less than a threshold;

determining that the UE does not send a measurement report comprising the signal strength greater than or equal to the threshold to the base station;

determining that a duration in which the UE receives a second message reaches a first preset duration, and that the UE does not receive a Radio Resource Control (RRC) connection reconfiguration message, wherein the second message indicates that the UE is to be handed over to the second communications system, and wherein the RRC connection reconfiguration message enables the UE to determine to set up the voice call bearer in the second communications system;

determining that a duration in which the UE receives a third message reaches a second preset duration, and that the UE does not receive the RRC connection reconfiguration message, wherein the third message indicates that the UE is to be redirected to the second communications system; or determining that a duration in which the UE receives the second response message reaches a third preset duration, and that the UE does not receive the RRC connection reconfiguration message.

4. The CSFB method of claim 1, further comprising sending an extended service request message in the second communications system, wherein a service type of the extended service request message is mobile originated (MO).

5. A circuit switched fallback (CSFB) method implemented by a user equipment (UE), wherein the CSFB method comprises:

receiving a call request in a first communications system, wherein the first communications system is a fifth generation (5G) communications system;

receiving, from the first communication system, a second request indicating that the UE is to be transferred to a second communications system, wherein the second communications system is a fourth generation (4G) communications system;

determining, that a voice call bearer cannot be set up in the second communications system after the UE is transferred to the second communications system, initiating, a CSFB in the second communications system when the voice call bearer cannot be set up in the second communications system;

receiving a first message from the second communications system;

initiating a mobile terminated (MT) CSFB based on the first message;

and wherein the determining that a voice call bearer cannot be setup in the second communication system is performed before receiving the first message from the second communications system.

6. The CSFB method of claim 5, further comprising:

determining, based on a second message, that the UE is to be handed over to the second communications system wherein the first request is the second message; and determining, based on a third message, that the UE is to be redirected to the second communications system when the first request is the third message.

7. The CSFB method of claim 5, further comprising:

sending a circuit switched and packet switched combined location update request in the second communications system, receiving a first response message corresponding to the circuit switched and packet switched combined location update request, and determining that the first response message carries first information that enables the UE to determine that an Internet Protocol (IP) Multimedia Subsystem (IMS) voice service cannot be performed using the second communications system;

sending a circuit switched and packet switched combined registration request in the second communications system, receiving a second response message corresponding to the circuit switched and packet switched combined registration request, and determining that the second response message carries second information that enables the UE to determine that the IMS voice service cannot be performed using the second communications system;

determining that a signal strength between the UE and a base station in the second communications system is less than a threshold;

determining that the UE does not send a measurement report comprising the signal strength greater than or equal to the threshold to the base station;

determining that a duration in which the UE receives a second message reaches a first preset duration, and that the UE does not receive a Radio Resource Control (RRC connection reconfiguration message, wherein the second message indicates that the UE is to be handed over to the second communications system, and wherein the RRC connection reconfiguration message enables the UE to determine to set up the voice call bearer in the second communications system;

determining that a duration in which the UE receives a third message reaches a second preset duration, and that the UE does not receive the RRC connection reconfiguration message, wherein the third message indicates that the UE is to be redirected to the second communications system; or determining that a duration in which the UE receives the second response message reaches a third preset duration, and that the UE does not receive the RRC connection reconfiguration message.

8. The CSFB method of claim 5, further comprising sending an extended service request message in the second communications system, wherein a service type of the extended service request message is mobile originated (MO).

9. The CSFB method of claim 5, wherein after initiating the CSFB in the second communications system, the CSFB method further comprises:
    initiating a location area update (LAU) in a circuit switched domain; or
    receiving a network paging message in the circuit switched domain.

10. The method of claim 9, wherein initiating the location area update LAU comprises sending an LAU request carrying a follow-on indication or a circuit switched fallback mobile terminated call (CSMT) indication.

11. A user equipment (UE) for circuit switched fallback (CSFB) comprising:
    a transmitter configured to send a call request in a first communications system, wherein the first communications system is a fifth generation (5G) communications system;
    a receiver coupled to the transmitter and configured to:
        receive, from the first communication system, a first request indicating that the UE is to be transferred to a second communications system, wherein the second communications system is a fourth generation (4G) communications system; and
        receive, after being transferred to the second communications system, a first message from the second communications system; and
    a processor coupled to the transmitter and the receiver and configured to:
        determine, based on the first message, that the call request cannot be set up in the second communications system;
        determine that a voice call bearer cannot be set up in the second communications system after the UE is transferred to the second communications system and before receiving the first message, and
    wherein the transmitter is further configured to initiate a CSFB in the second communications system when the voice call bearer cannot be set up in the second communications system.

12. The UE of claim 11, wherein the processor is further configured to:

determine, based on a second message, that the UE is to be handed over to the second communications system when the first request is the second message; and determine, based on a third message, that the UE is to be redirected to the second communications system when the first request is the third message.

13. The UE of claim 11, wherein the processor is further configured to:
    cause the transmitter to send a circuit switched and packet switched combined location update request in the second communications system;
    cause the receiver to receive a first response message that corresponds to the circuit switched and packet switched combined location update request and that carries first information;
    determine, based on the first information, that an Internet Protocol (IP) Multimedia Subsystem (IMS) voice service cannot be performed by using the second communications system;
    cause the transmitter to send a circuit switched and packet switched combined registration request in the second communications system;
    cause the receiver to receive a second response message that corresponds to the circuit switched and packet switched combined registration request and that carries second information;
    determine, based on the second information, that the IMS voice service cannot be performed using the second communications system;
    determine that a signal strength between the UE and a base station in the second communications system is less than a threshold;
    determine that the transmitter does not send a measurement report comprising the signal strength greater than or equal to the threshold to the base station;
    determine that a duration in which the receiver receives a second message reaches a first preset duration, and that the receiver does not receive a Radio Resource Control (RRC) connection reconfiguration message, wherein the second message indicates that the UE is to be handed over to the second communications system, and wherein the RRC connection reconfiguration message enables the processor to determine to set up the voice call bearer in the second communications system;
    determine that a duration in which the receiver receives a third message reaches a second preset duration, and that the receiver does not receive the RRC connection reconfiguration message, wherein the third message enables the processor to determine that the UE is to be redirected to the second communications system; and
    determine that a duration in which the receiver receives the second response message reaches a third preset duration, and that the receiver does not receive the RRC connection reconfiguration message.

14. The UE of claim 11, wherein the transmitter is further configured to send an extended service request message in the second communications system, and wherein a service type of the extended service request message is mobile originated (MO).

15. A user equipment (UE) for circuit switched fallback (CSFB) comprising:
    a receiver configured to:
        receive a call request in a first communications system, wherein the first communications system is a fifth generation (5G) communications system;
        receive, from the first communications system, a first request indicating that the UE is to be transferred to a second communications system, wherein the second communications system is a fourth generation (4G) communications system; and
receive a first message from the second communications system;
a processor coupled to the receiver and configured to:
initiate a mobile terminated (MT) CSFB based on the first message; and
determine that a voice call bearer cannot be set up in the second communications system after the UE is transferred to the second communications system and before receiving the first message; and
a transmitter coupled to the receiver and the processor and configured to initiate a CSFB in the second communications system when the voice call bearer cannot be set up in the second communications system.

16. The UE of claim 15, wherein the processor is further configured to:
determine, based on a second message, that the UE is to be handed over to the second communications system when the first request is the second message; and
determine, based on a third message, that the UE is to be redirected to the second communications system when the first request is the third message.

17. The UE of claim 15, wherein the processor is further configured to:
cause the transmitter to send a circuit switched and packet switched combined location update request in the second communications system;
cause the receiver to receive a first response message that corresponds to the circuit switched and packet switched combined location update request and that carries first information;
determine, based on the first information, that an Internet Protocol (IP) Multimedia Subsystem (IMS) voice service cannot be performed using the second communications system;
cause the transmitter to send a circuit switched and packet switched combined registration request in the second communications system;
cause the receiver to receive a second response message that corresponds to the circuit switched and packet switched combined registration request and that carries second information;
determine, based on the second information, that the IMS voice service cannot be performed using the second communications system;
determine that a signal strength between the UE and a base station in the second communications system is less than a threshold;
determine that the UE does not send a measurement report comprising the signal strength greater than or equal to the threshold to the base station;
determine that a duration in which the receiver receives a second message reaches a first preset duration, and that the receiver does not receive a Radio Resource Control (RRC) connection reconfiguration message, wherein the second message indicates that the UE is to be handed over to the second communications system, and wherein the RRC connection reconfiguration message enables the processor to determine to set up the voice call bearer in the second communications system;
determine that a duration in which the receiver receives a third message reaches a second preset duration, and that the receiver does not receive the RRC connection reconfiguration message, wherein the third message enables the processor to determine that the UE is to be redirected to the second communications system; and
determine that a duration in which the receiver receives the second response message reaches a third preset duration, and that the receiver does not receive the RRC connection reconfiguration message.

18. The UE of claim 15, wherein the transmitter is further configured to send an extended service request message in the second communications system, and wherein a service type of the extended service request message is mobile originated (MO).

19. The UE of claim 15, wherein the transmitter is further configured to initiate a location area update (LAU) in a circuit switched domain, or wherein the receiver is further configured to receive a network paging message in the circuit switched domain.

20. The UE of claim 19, wherein the transmitter is further configured to send an LAU request, wherein the LAU request carries a follow on indication or a circuit switched fallback mobile terminated call (CSMT) indication.

* * * * *